(12) United States Patent
Adelman et al.

(10) Patent No.: US 12,417,100 B2
(45) Date of Patent: Sep. 16, 2025

(54) INSTRUCTIONS FOR STRUCTURED-SPARSE TILE MATRIX FMA

(71) Applicant: Intel Corporation, Santa Clara, CA (US)

(72) Inventors: Menachem Adelman, Modi'in (IL); Amit Gradstein, Binyamina (IL); Alexander Heinecke, San Jose, CA (US); Christopher Hughes, Santa Clara, CA (US); Naveen Mellempudi, Bangalore (IN); Shahar Mizrahi, Haifa (IL); Dana Rip, Haifa (IL); Simon Rubanovich, Haifa (IL); Uri Sherman, Bustan Hagalil (IL); Guy Boudoukh, Ramat Hasharon (IL); Evangelos Georganas, San Jose, CA (US); Nilesh Jain, Portland, OR (US); Barukh Ziv, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/958,381

(22) Filed: Oct. 1, 2022

(65) Prior Publication Data
US 2024/0045685 A1   Feb. 8, 2024

(51) Int. Cl.
*G06F 9/30* (2018.01)
*G06F 17/16* (2006.01)

(52) U.S. Cl.
CPC ........ *G06F 9/30145* (2013.01); *G06F 9/3001* (2013.01); *G06F 9/30025* (2013.01); *G06F 17/16* (2013.01)

(58) Field of Classification Search
CPC .. G06F 9/30145; G06F 9/30025; G06F 17/16; G06F 17/15; G06N 3/063
See application file for complete search history.

(56) References Cited

U.S. PATENT DOCUMENTS

| | | | |
|---|---|---|---|
| 11,676,068 B1 * | 6/2023 | Zimmer | G06N 3/0495 |
| | | | 706/12 |
| 2018/0121168 A1 * | 5/2018 | Langhammer | G06F 7/49915 |
| 2018/0300105 A1 * | 10/2018 | Langhammer | G06F 17/16 |
| 2019/0065150 A1 * | 2/2019 | Heddes | G06N 3/044 |
| 2019/0079768 A1 * | 3/2019 | Heinecke | G06F 9/30014 |
| 2020/0210517 A1 * | 7/2020 | Baum | G06F 9/30101 |
| 2020/0265107 A1 * | 8/2020 | Narayanamoorthy | |
| | | | G06F 7/5443 |
| 2021/0064976 A1 * | 3/2021 | Sun | G06N 3/063 |
| 2021/0081201 A1 * | 3/2021 | Maiyuran | G06F 9/3893 |
| 2021/0191724 A1 * | 6/2021 | Pal | G06F 9/3001 |
| 2024/0036821 A1 * | 2/2024 | Burgess | G06F 7/483 |

* cited by examiner

*Primary Examiner* — Jacob Petranek
(74) *Attorney, Agent, or Firm* — Nicholson De Vos Webster & Elliott LLP

(57) ABSTRACT

Systems, methods, and apparatuses relating sparsity based FMA. In some examples, an instance of a single FMA instruction has one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of FP8 data elements from the first plurality of source matrix operands based on sparsity controls from a first matrix operand of the second plurality of matrix operands and perform a FMA.

23 Claims, 40 Drawing Sheets

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

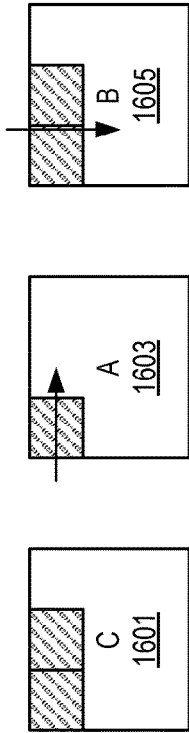

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| . . . | |
| TMM15 ROWS | TMM15 COLUMNS |
| 0 | |

SPARSITY CONTROL TILE FOR INT8 2401

ROW0
ROW1
ROW2
ROW3

FETCH AN INSTANCE OF A SINGLE INSTRUCTION HAVING ONE OR MORE FIELDS FOR AN OPCODE, ONE OR MORE FIELDS TO IDENTIFY A SOURCE/DESTINATION MATRIX (TILE) OPERAND, ONE OR MORE FIELDS TO IDENTIFY A FIRST PLURALITY OF SOURCE MATRIX (TILE) OPERANDS, ONE OR MORE FIELDS TO IDENTIFY A SECOND PLURALITY OF MATRIX (TILE) OPERANDS, WHEREIN THE OPCODE IS TO INDICATE THAT EXECUTION CIRCUITRY IS TO SELECT A PROPER SUBSET OF FP8 DATA ELEMENTS FROM THE FIRST PLURALITY OF SOURCE MATRIX (TILE) OPERANDS BASED ON SPARSITY CONTROLS FROM A FIRST MATRIX (TILE) OPERAND OF THE SECOND PLURALITY OF MATRIX (TILE) OPERANDS, FOR EACH ELEMENT POSITION OF THE SOURCE/DESTINATION MATRIX (TILE), CONVERT PAIRS OF FP8 ELEMENTS, AS SELECTED, FROM A ROW OF THE FIRST SOURCE MATRICES AND PAIRS OF FP8 ELEMENTS FROM A COLUMN OF ONE OF THE SECOND SOURCE MATRICES TO FP32, MULTIPLY CONVERTED EVEN ELEMENTS FROM THE TWO SPECIFIED SOURCE MATRICES TO GENERATE A FIRST PRODUCT AND SEPARATELY MULTIPLY CONVERTED ODD ELEMENTS FROM THE SPECIFIED SOURCE MATRICES TO GENERATE SECOND PRODUCT, AND ACCUMULATE THE FIRST AND SECOND PRODUCTS WITH PREVIOUS CONTENTS OF THE SOURCE/DESTINATION MATRIX (TILE)
2501

TRANSLATE THE FETCHED INSTRUCTION INTO ONE OR MORE INSTRUCTIONS 2502

DECODE THE ONE OR MORE INSTRUCTIONS 2503

RETRIEVE DATA ASSOCIATED WITH THE SOURCE OPERANDS AND SCHEDULE 2505

EXECUTE THE DECODED INSTRUCTION(S) ACCORDING TO THE OPCODE OF INSTANCE OF THE SINGLE INSTRUCTION
2507

COMMIT A RESULT OF THE EXECUTED INSTRUCTION(S)
2509

FIG. 25

FETCH AN INSTANCE OF A SINGLE INSTRUCTION HAVING ONE OR MORE FIELDS FOR AN OPCODE, ONE OR MORE FIELDS TO IDENTIFY A SOURCE/DESTINATION MATRIX (TILE) OPERAND, ONE OR MORE FIELDS TO IDENTIFY A FIRST PLURALITY OF SOURCE MATRIX (TILE) OPERANDS, ONE OR MORE FIELDS TO IDENTIFY A SECOND PLURALITY OF MATRIX (TILE) OPERANDS, WHEREIN THE OPCODE IS TO INDICATE THAT EXECUTION CIRCUITRY IS TO SELECT A PROPER SUBSET OF FP8 DATA ELEMENTS FROM THE FIRST PLURALITY OF SOURCE MATRIX (TILE) OPERANDS BASED ON SPARSITY CONTROLS FROM A FIRST MATRIX (TILE) OPERAND OF THE SECOND PLURALITY OF MATRIX (TILE) OPERANDS, FOR EACH ELEMENT POSITION OF THE SOURCE/DESTINATION MATRIX (TILE), MULTIPLY SELECTED EVEN FP8 ELEMENTS FROM THE TWO SPECIFIED SOURCE MATRICES TO GENERATE A FIRST PRODUCT AND SEPARATELY MULTIPLY SELECTED ODD FP8 ELEMENTS FROM THE SPECIFIED SOURCE MATRICES TO GENERATE SECOND PRODUCT, AND ACCUMULATE THE FIRST AND SECOND PRODUCTS WITH PREVIOUS CONTENTS OF THE SOURCE/DESTINATION MATRIX (TILE)
2601

TRANSLATE THE FETCHED INSTRUCTION INTO ONE OR MORE INSTRUCTIONS 2602

DECODE THE ONE OR MORE INSTRUCTIONS 2603

RETRIEVE DATA ASSOCIATED WITH THE SOURCE OPERANDS AND SCHEDULE 2605

EXECUTE THE DECODED INSTRUCTION(S) ACCORDING TO THE OPCODE OF INSTANCE OF THE SINGLE INSTRUCTION
2607

COMMIT A RESULT OF THE EXECUTED INSTRUCTION(S)
2609

FIG. 26

```
def select_bytes_8_4(qword, ctrl):
    bytes[0..3] := 0
    i := 0
    for j in 0 .. 7:
        if ctrl.bit(j) == 1:
            bytes[i] := qword.byte(j)
            i += 1
        if i == 4:
            return bytes
    return bytes
```

TDPSBF8PS TSRCDEST, TSRC1, TSRC2
// C = M X N (TSRCDEST), A = M X K (TSRC1), B = K X N (TSRC2)

//TILES[] IS THE TILE REGISTER FILE
TABASE := TSRC1 & ~1 // A PAIR BASE. FOR EXAMPLE, IF TSRC1==5 THEN TABASE IS 4
TB := TILES[TSRC2 & ~1] // B TILE
TSC := TILES[TSRC2 | 1] // SPARSITY CONTROLS TILE

ELEMENTS_DEST:= TSRCDEST.COLSB/4

QELEMENTS := PALETTE[PALETTE_ID].MAX_COLSB/8 // QWORD ELEMENTS IN FULL TILE ROW
SC_SIZE := PALETTE[PALETTE_ID].MAX_COLSB/4 // SPARSITY CONTROLS SIZE IN BYTES FOR 1 ROW

FOR M IN 0 ... TSRCDEST.ROWS-1:
  TEMP1[ 0 ... ELEMENTS_TEMP1-1 ] := 0
  FOR K IN 0 ... TB.ROWS-1:
    FOR N IN 0 ... ELEMENTS_DEST-1:

Q1 := TILES[TABASE + K/QELEMENTS].ROW[M].QWORD[K%QELEMENTS]
      SC := TSC.ROW[K/4].BYTE[(K%4) * SC_SIZE + N]

S1 := SELECT_BYTES_8_4(Q1, SC)

// FP32 MUL WITH DAZ=1, FTZ=1, RNE ROUNDING.
      // MXCSR IS NEITHER CONSULTED NOR UPDATED.
      // NO EXCEPTIONS RAISED OR DENOTED.
      TEMP2.FP32[4*N+0] = CONVERT_BF8_TO_FP32(S1.BFLOAT8[0]) *
              CONVERT_BF8_TO_FP32(TSRC2.ROW[K].BFLOAT8[4*N+0]);
      TEMP2.FP32[4*N+1] = CONVERT_BF8_TO_FP32(S1.BFLOAT8[1]) *
              CONVERT_BF8_TO_FP32(TSRC2.ROW[K].BFLOAT8[4*N+1]);
      TEMP2.FP32[4*N+2] = CONVERT_BF8_TO_FP32(S1.BFLOAT8[2]) *
              CONVERT_BF8_TO_FP32(TSRC2.ROW[K].BFLOAT8[4*N+2]);
      TEMP2.FP32[4*N+3] = CONVERT_BF8_TO_FP32(S1.BFLOAT8[3]) *
              CONVERT_BF8_TO_FP32(TSRC2.ROW[K].BFLOAT8[4*N+3]);

// FP32 ADD, RNE ROUNDING
      // MXCSR IS NEITHER CONSULTED NOR UPDATED.
      // NO EXCEPTIONS RAISED OR DENOTED.
      TEMP3.FP32[2*N+0] = TEMP2.FP32[4*N+0] + TEMP2.FP32[4*N+1];
      TEMP3.FP32[2*N+1] = TEMP2.FP32[4*N+2] + TEMP2.FP32[4*N+3];

// FP32 ADD WITH DAZ=FTZ=1, RNE ROUNDING
      // MXCSR IS NEITHER CONSULTED NOR UPDATED.
      // NO EXCEPTIONS RAISED OR DENOTED.
      TEMP1.FP32[2*N+0] += TEMP3.FP32[2*N+0];
      TEMP1.FP32[2*N+1] += TEMP3.FP32[2*N+1];

FOR N IN 0 ... ELEMENTS_DEST-1:
    // DAZ=FTZ=1, RNE ROUNDING.
    // MXCSR IS NEITHER CONSULTED NOR UPDATED.
    // NO EXCEPTIONS RAISED OR DENOTED.
    TMPF32 := TEMP1.FP32[2*N] + TEMP1.FP32[2*N+1]
    TMP.FP32[N] := SRCDEST.ROW[M].FP32[N] + TMPF32
  WRITE_ROW_AND_ZERO(TSRCDEST, M, TMP, TSRCDEST.COLSB)

ZERO_UPPER_ROWS(TSRCDEST, TSRCDEST.ROWS)
ZERO_TILECONFIG_START()

FIG. 27

```
def select_bytes_8_4(qword, ctrl):
    bytes[0..3] := 0
    i := 0
    for j in 0 .. 7:
        if ctrl.bit(j) == 1:
            bytes[i] := qword.byte(j)
            i += 1
            if i == 4:
                return bytes
    return bytes
```

TDPSHF8PS TSRCDEST, TSRC1, TSRC2
// C = M X N (TSRCDEST), A = M X K (TSRC1), B = K X N (TSRC2)

//TILES[] IS THE TILE REGISTER FILE
TABASE := TSRC1 & ~1 // A PAIR BASE. FOR EXAMPLE, IF TSRC1==5 THEN TABASE IS 4
TB := TILES[TSRC2 & ~1] // B TILE
TSC := TILES[TSRC2 | 1] // SPARSITY CONTROLS TILE

ELEMENTS_DEST:= TSRCDEST.COLSB/4

QELEMENTS := PALETTE[PALETTE_ID].MAX_COLSB/8 // QWORD ELEMENTS IN FULL TILE ROW
SC_SIZE := PALETTE[PALETTE_ID].MAX_COLSB/4 // SPARSITY CONTROLS SIZE IN BYTES FOR 1 ROW

FOR M IN 0 ... TSRCDEST.ROWS-1:
  TEMP1[ 0 ... ELEMENTS_TEMP1-1 ] := 0
  FOR K IN 0 ... TB.ROWS-1:
    FOR N IN 0 ... ELEMENTS_DEST-1:

Q1 := TILES[TABASE + K/QELEMENTS].ROW[M].QWORD[K%QELEMENTS]
      SC := TSC.ROW[K/4].BYTE[(K%4) * SC_SIZE + N]

S1 := SELECT_BYTES_8_4(Q1, SC)

// FP32 MUL WITH DAZ=1, FTZ=1, RNE ROUNDING.
      // MXCSR IS NEITHER CONSULTED NOR UPDATED.
      // NO EXCEPTIONS RAISED OR DENOTED.
      TEMP2.FP32[4*N+0] = CONVERT_HF8_TO_FP32(S1.BFLOAT8[0]) *
              CONVERT_HF8_TO_FP32(TSRC2.ROW[K].BFLOAT8[4*N+0]);
      TEMP2.FP32[4*N+1] = CONVERT_HF8_TO_FP32(S1.BFLOAT8[1]) *
              CONVERT_HF8_TO_FP32(TSRC2.ROW[K].BFLOAT8[4*N+1]);
      TEMP2.FP32[4*N+2] = CONVERT_HF8_TO_FP32(S1.BFLOAT8[2]) *
              CONVERT_HF8_TO_FP32(TSRC2.ROW[K].BFLOAT8[4*N+2]);
      TEMP2.FP32[4*N+3] = CONVERT_HF8_TO_FP32(S1.BFLOAT8[3]) *
              CONVERT_HF8_TO_FP32(TSRC2.ROW[K].BFLOAT8[4*N+3]);

// FP32 ADD, RNE ROUNDING
      // MXCSR IS NEITHER CONSULTED NOR UPDATED.
      // NO EXCEPTIONS RAISED OR DENOTED.
      TEMP3.FP32[2*N+0] = TEMP2.FP32[4*N+0] + TEMP2.FP32[4*N+1];
      TEMP3.FP32[2*N+1] = TEMP2.FP32[4*N+2] + TEMP2.FP32[4*N+3];

// FP32 ADD WITH DAZ=FTZ=1, RNE ROUNDING
      // MXCSR IS NEITHER CONSULTED NOR UPDATED.
      // NO EXCEPTIONS RAISED OR DENOTED.
      TEMP1.FP32[2*N+0] += TEMP3.FP32[2*N+0];
      TEMP1.FP32[2*N+1] += TEMP3.FP32[2*N+1];

FOR N IN 0 ... ELEMENTS_DEST-1:
    // DAZ=FTZ=1, RNE ROUNDING.
    // MXCSR IS NEITHER CONSULTED NOR UPDATED.
    // NO EXCEPTIONS RAISED OR DENOTED.
    TMPF32 := TEMP1.FP32[2*N] + TEMP1.FP32[2*N+1]
    TMP.FP32[N] := SRCDEST.ROW[M].FP32[N] + TMPF32
  WRITE_ROW_AND_ZERO(TSRCDEST, M, TMP, TSRCDEST.COLSB)

ZERO_UPPER_ROWS(TSRCDEST, TSRCDEST.ROWS)
ZERO_TILECONFIG_START()

INSTRUCTIONS FOR STRUCTURED-SPARSE TILE MATRIX FMA

TECHNICAL FIELD

The disclosure relates generally to computer processor architecture, and, more specifically, to systems and methods for performing 8-bit floating-point sparse tile instructions.

BACKGROUND

Matrices are increasingly important in many computing tasks such as machine learning and other bulk data processing. Deep Learning is a class of machine learning algorithms. Deep learning architectures, such as deep neural networks, have been applied to fields including computer vision, speech recognition, natural language processing, audio recognition, social network filtering, machine translation, bioinformatics and drug design.

Inference and training, two tools used for deep learning, are tending towards low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a common compute-heavy operation on modern processors. Special hardware for matrix multiplication (e.g., GEMM) is a good option for improving the peak compute (and energy efficiency) of certain applications, such as deep learning.

Some of these applications, including deep learning, can operate on input data elements with relatively few bits without losing accuracy, as long as the output elements have enough bits (i.e., more than the inputs).

BRIEF DESCRIPTION OF THE DRAWINGS

The present disclosure is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;
FIG. 15 illustrates an example of a matrix expressed in row major format and column major format;
FIG. 16 illustrates an example of usage of matrices (tiles);
FIG. 19 illustrates an embodiment of a description of the matrices (tiles) to be supported;
FIG. 24 illustrates examples of sparsity control tiles;
FIG. 25 illustrates examples of a method to process a sparsity FMA instruction;
FIG. 26 illustrates examples of a method to process a sparsity FMA instruction;
FIG. 27 illustrates exemplary pseudocode for a TDPS[X] BF8PS instruction;
FIG. 28 illustrates exemplary pseudocode for a TDPS[X] HF8PS instruction.

DETAILED DESCRIPTION

Figure 1A:
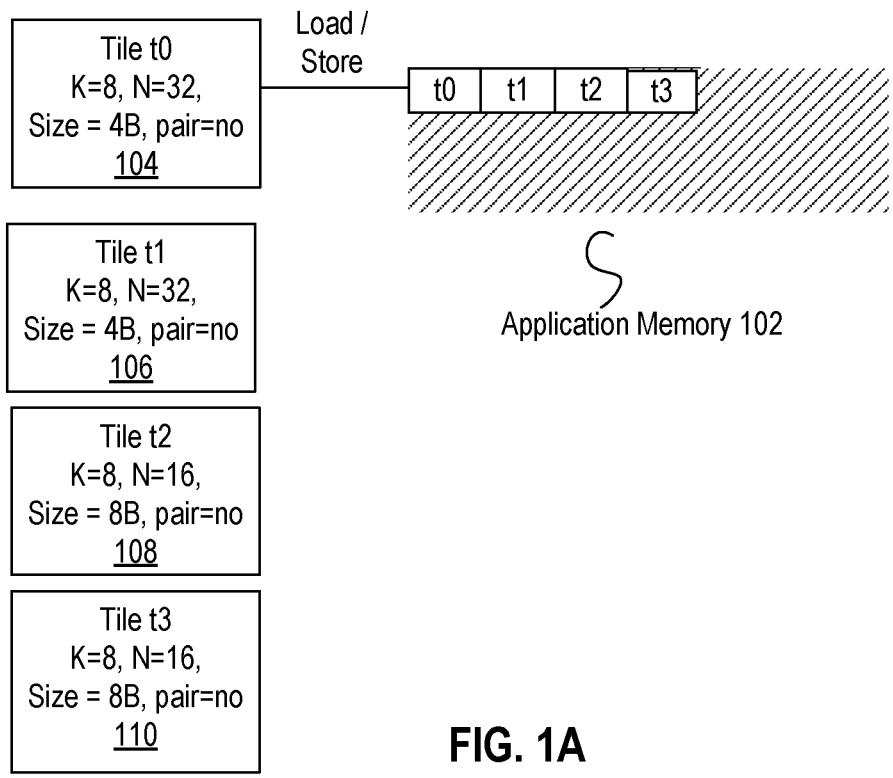
FIG. 1A illustrates an embodiment of configured tiles.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating-point, double precision floating-point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and/or whether the tile consists of a PAIR of equal-sized tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
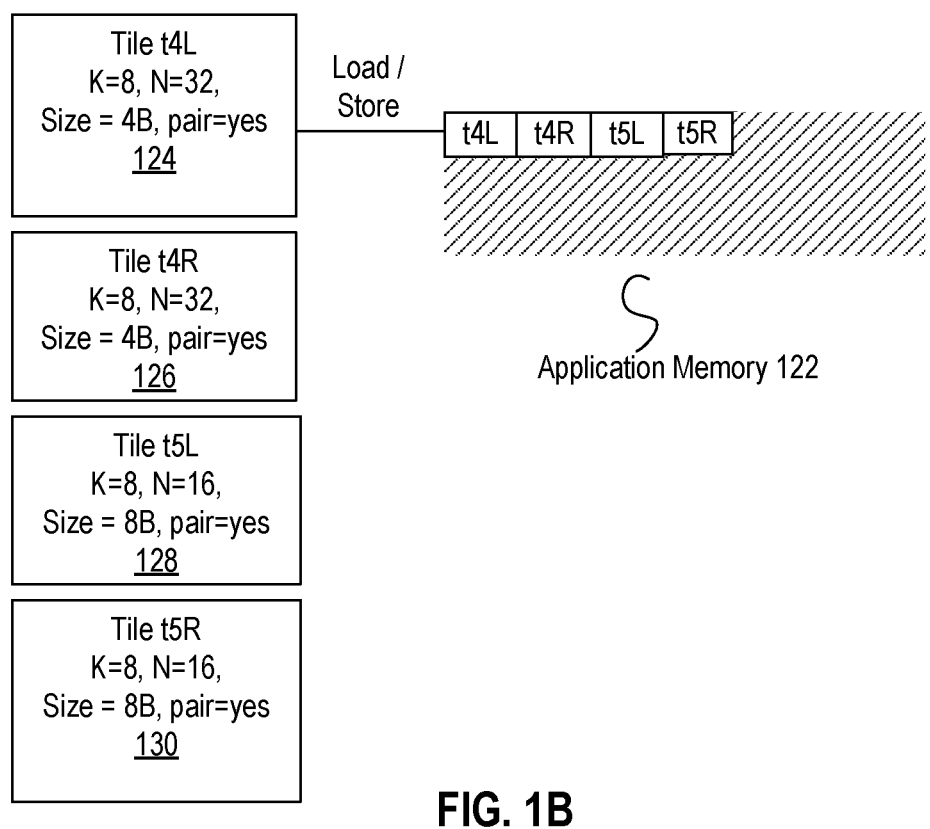
FIG. 1B illustrates an embodiment of configured tiles.

FIG. 1B illustrates an embodiment of configured tiles. As shown, 4 kB of application memory 122 have stored thereon 2 pairs of 1 kB-tiles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating-point data), where K equals 8 and N equals 32. Tile t5L 128 and tile t5R 130 have K rows and N/2 columns of 8-byte elements (e.g., double precision floating-point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Configuration of tiles is done using a matrix (tile) configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Exemplary Tile Storage Types

Figure 2:
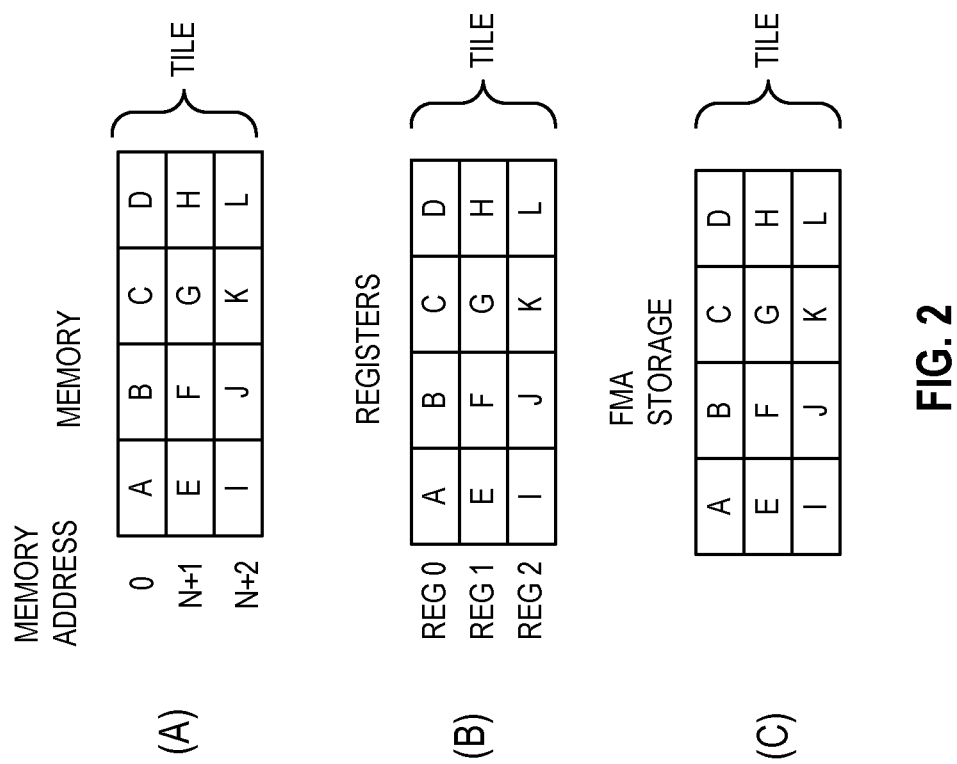
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allow for access of one row to then next when the tile storage does not map the underlying memory array row width.

Tile loads from memory and stores to memory are typically strided accesses from the application memory to packed rows of data. Exemplary TILELOAD and TILE-STORE instructions, or other instruction references to application memory as a TILE operand in load-op instructions, are, in some embodiments, restartable to handle (up to) 2*rows of page faults, unmasked floating-point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiply accumulate (FMA) circuit used in tile operations. This storage may be inside of an FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data into the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating-point operations also allow for unmasked floating-point exceptions, with the masking of the exceptions controlled by a control and/or status register.

To support restarting instructions after these events, the instructions store information in the start registers detailed below.

Matrix (Tile) Operation Systems

Exemplary Hardware Support

Figure 3:
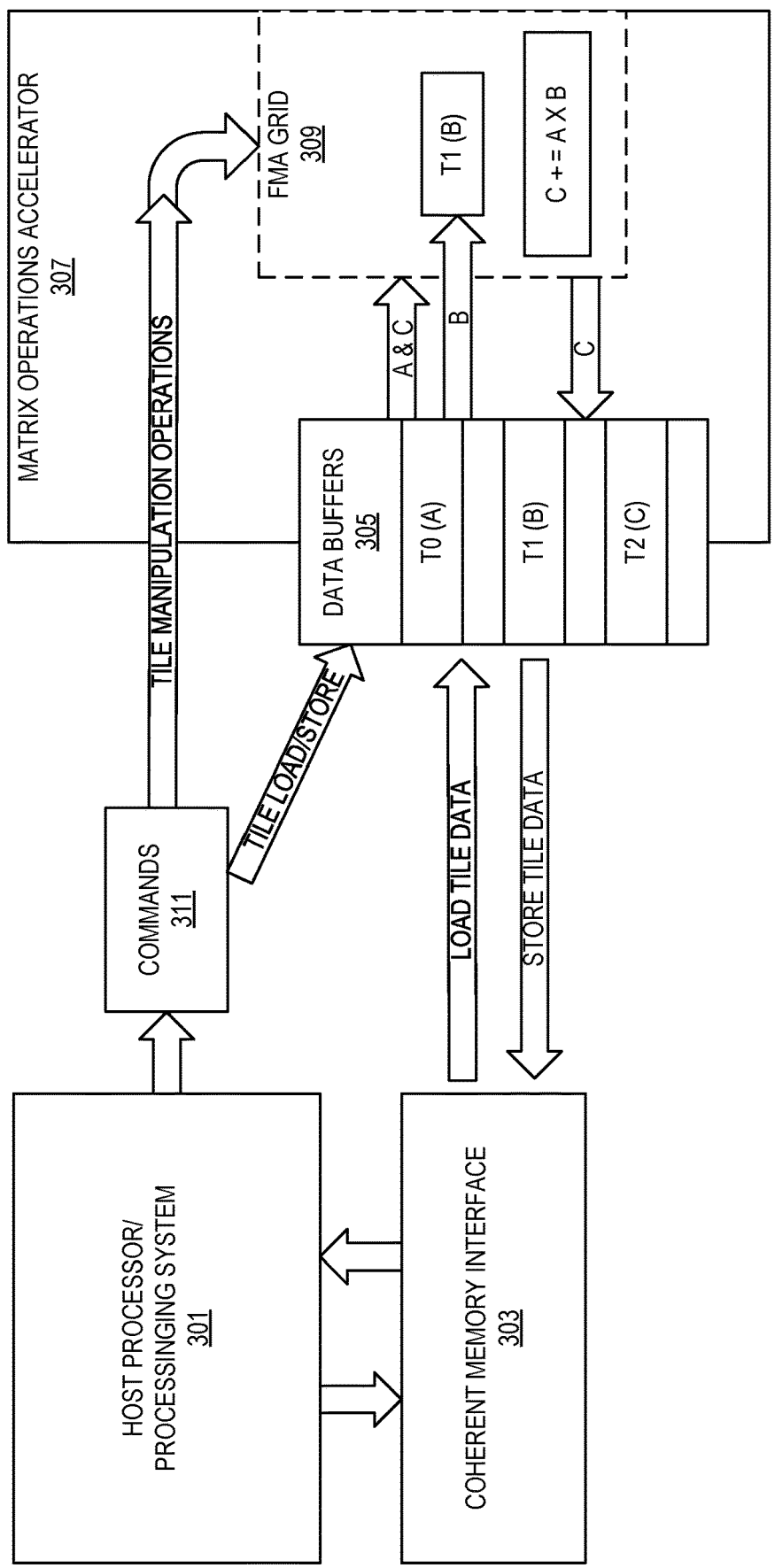
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
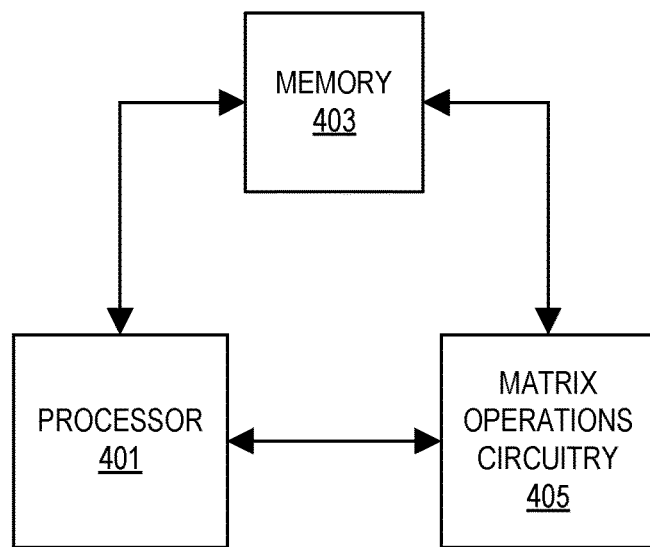
FIGS. 4 and 5 show different embodiments of how memory is shared using a matrix operations accelerator.
Figure 5:
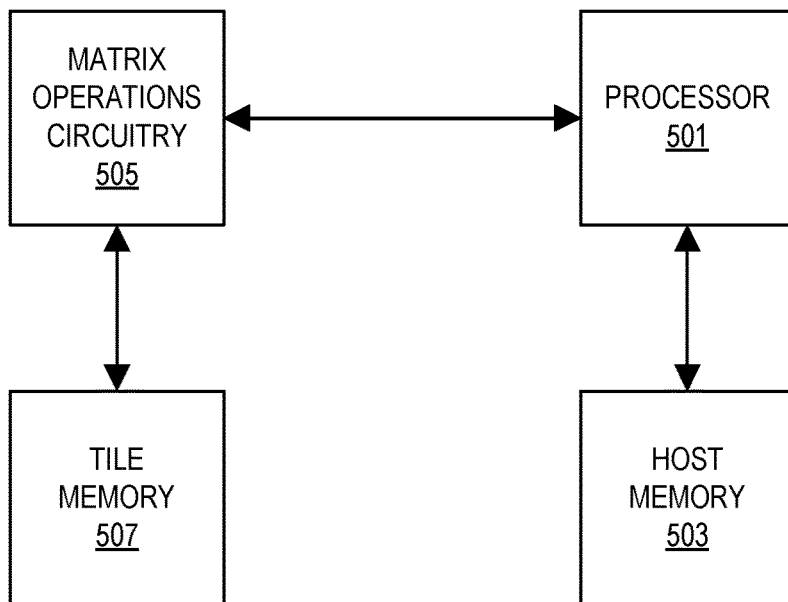

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
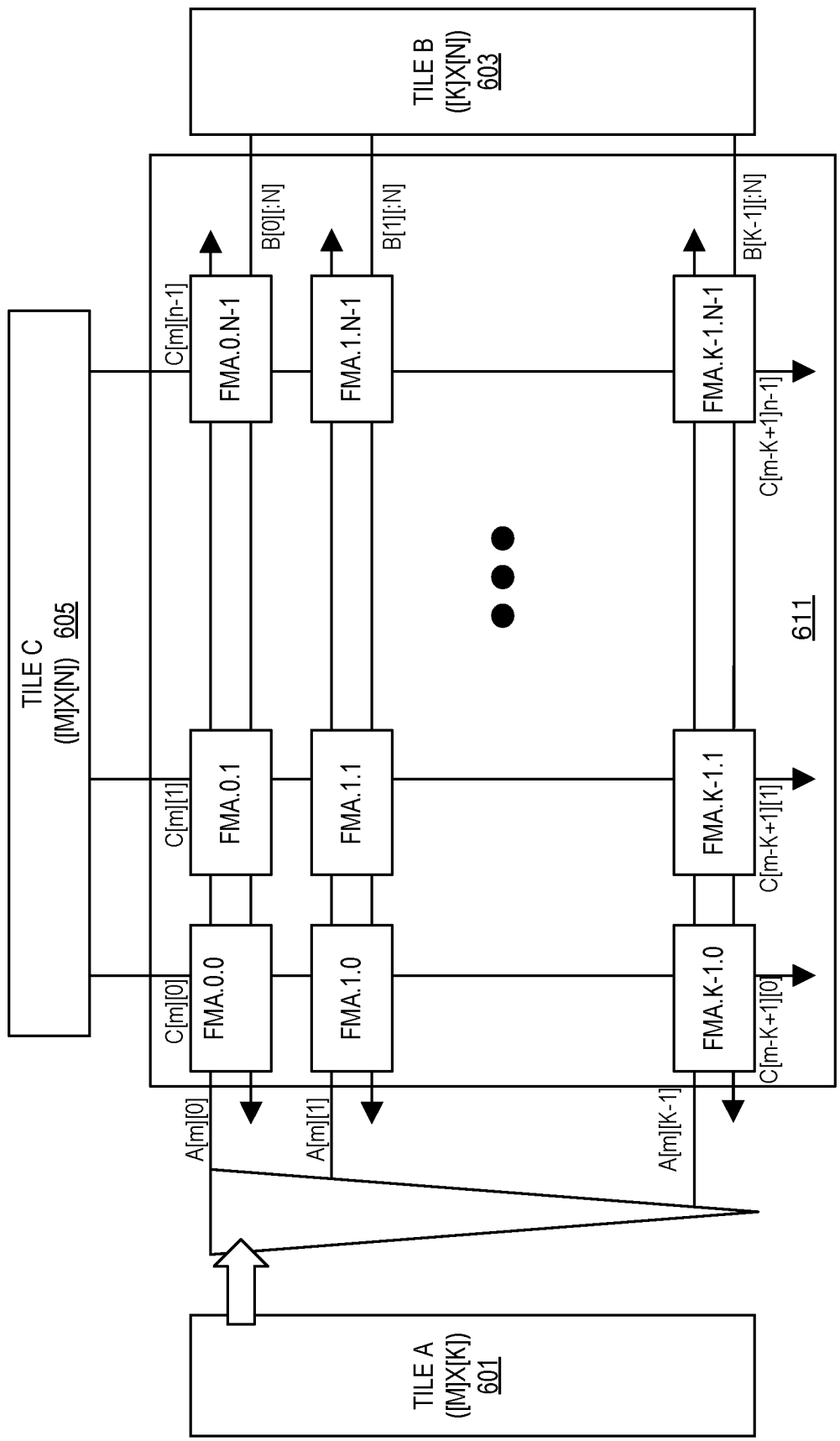
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the FIG.) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
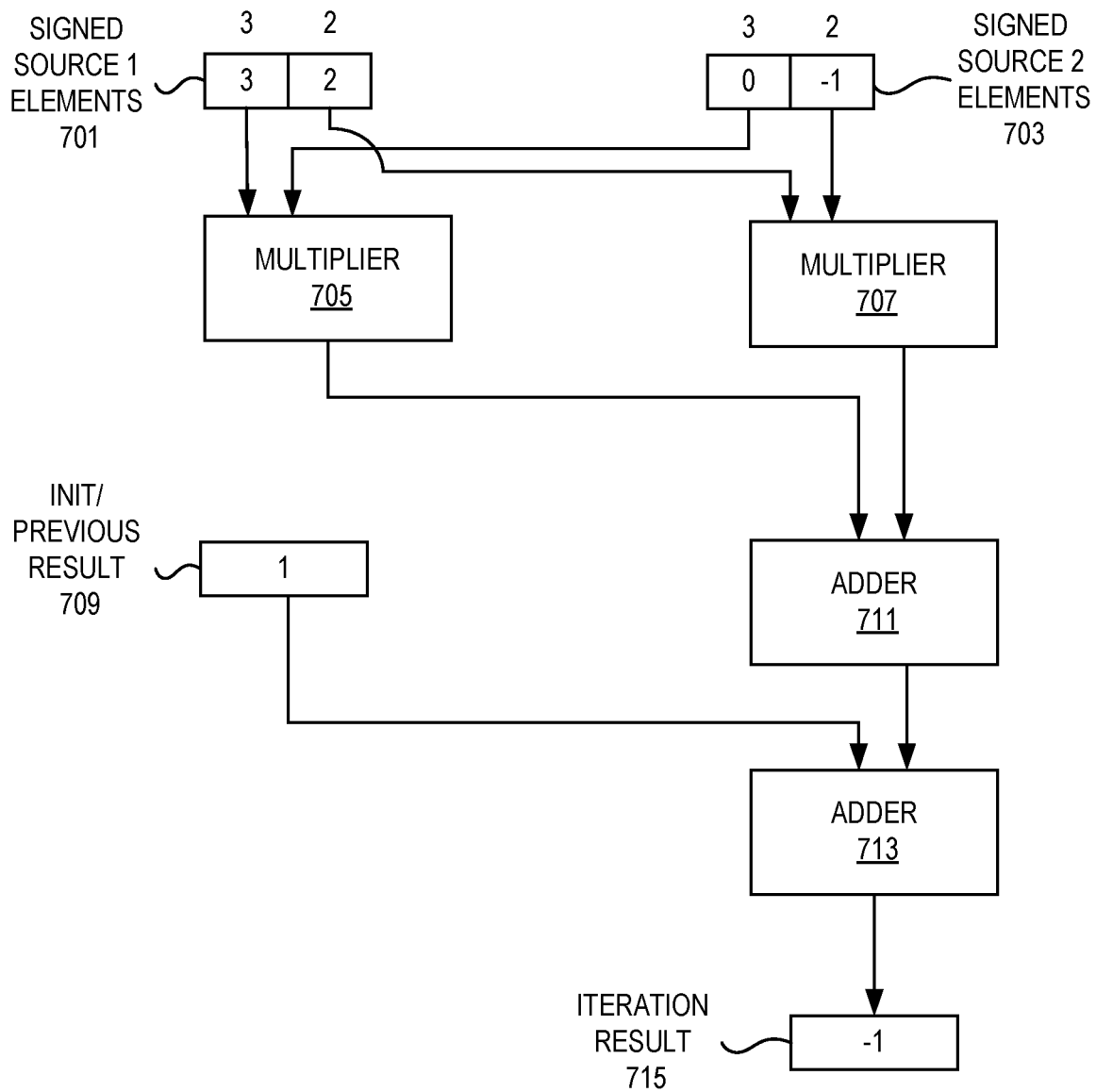
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size. Note this can be extended by adding additional multipliers when there are more source elements to consider (e.g., 4 pairs).

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating-point) while the third signed source 709 could have 64-bit packed data elements (e.g., double precision floating-point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
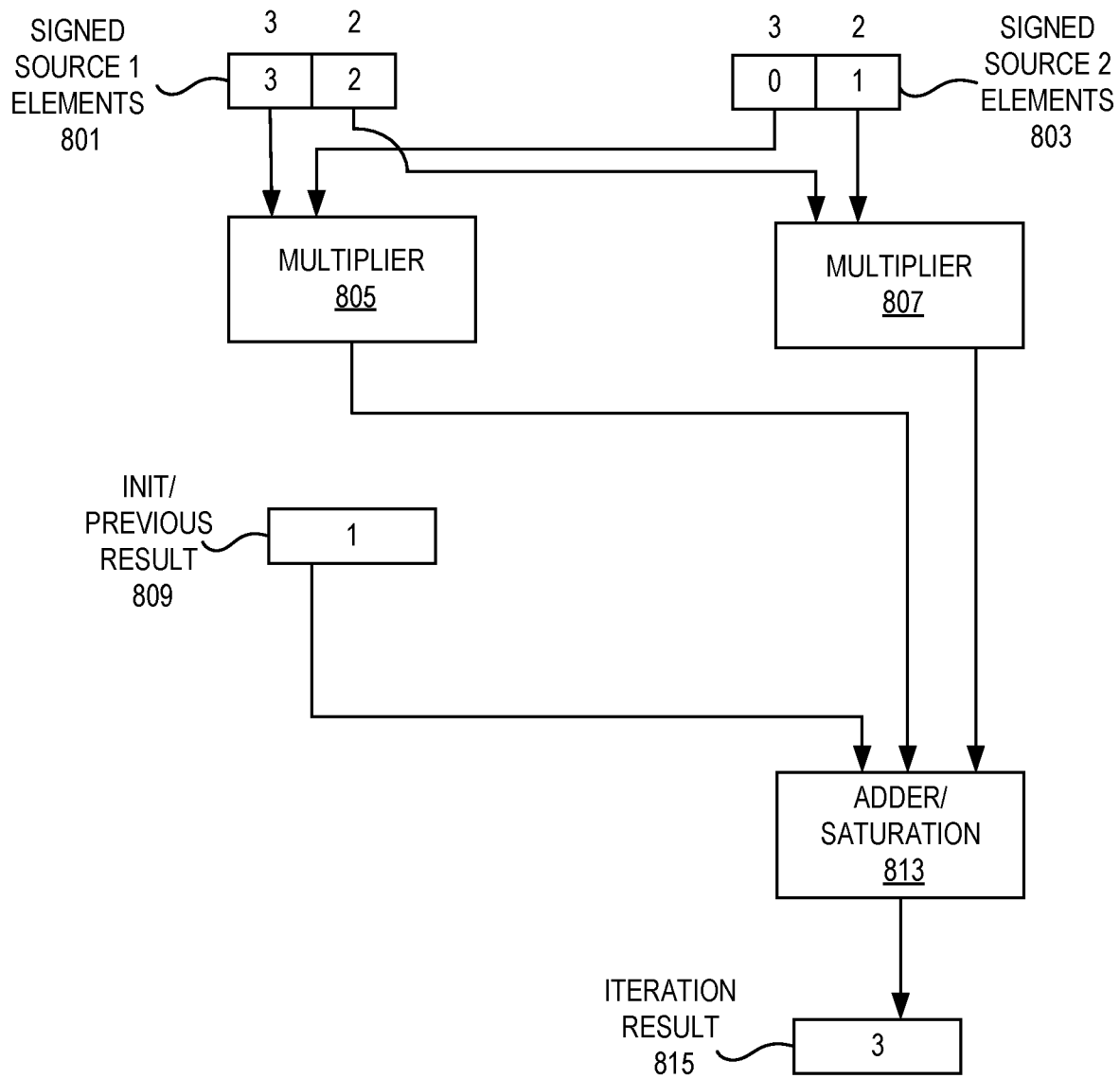
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size. Note this can be extended by adding additional multipliers when there are more source elements to consider (e.g., 4 pairs).

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating-point) the third signed source 809 could have 64-bit packed data elements (e.g., double precision floating-point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, multiplier circuits 805 and 807 perform the multiplications with infinite precision without saturation and use adder/saturation circuitry 813 to saturate the results of the accumulation to plus or minus infinity in case of an overflow and to zero in case of any underflow. In other embodiments, multiplier circuits 805 and 807 perform the saturation themselves. In some embodiments, these multiplier circuits 805 and 807 are reused for other packed data element positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from $-128$ ($=-2^7$) to $127(=2^7-1)$).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
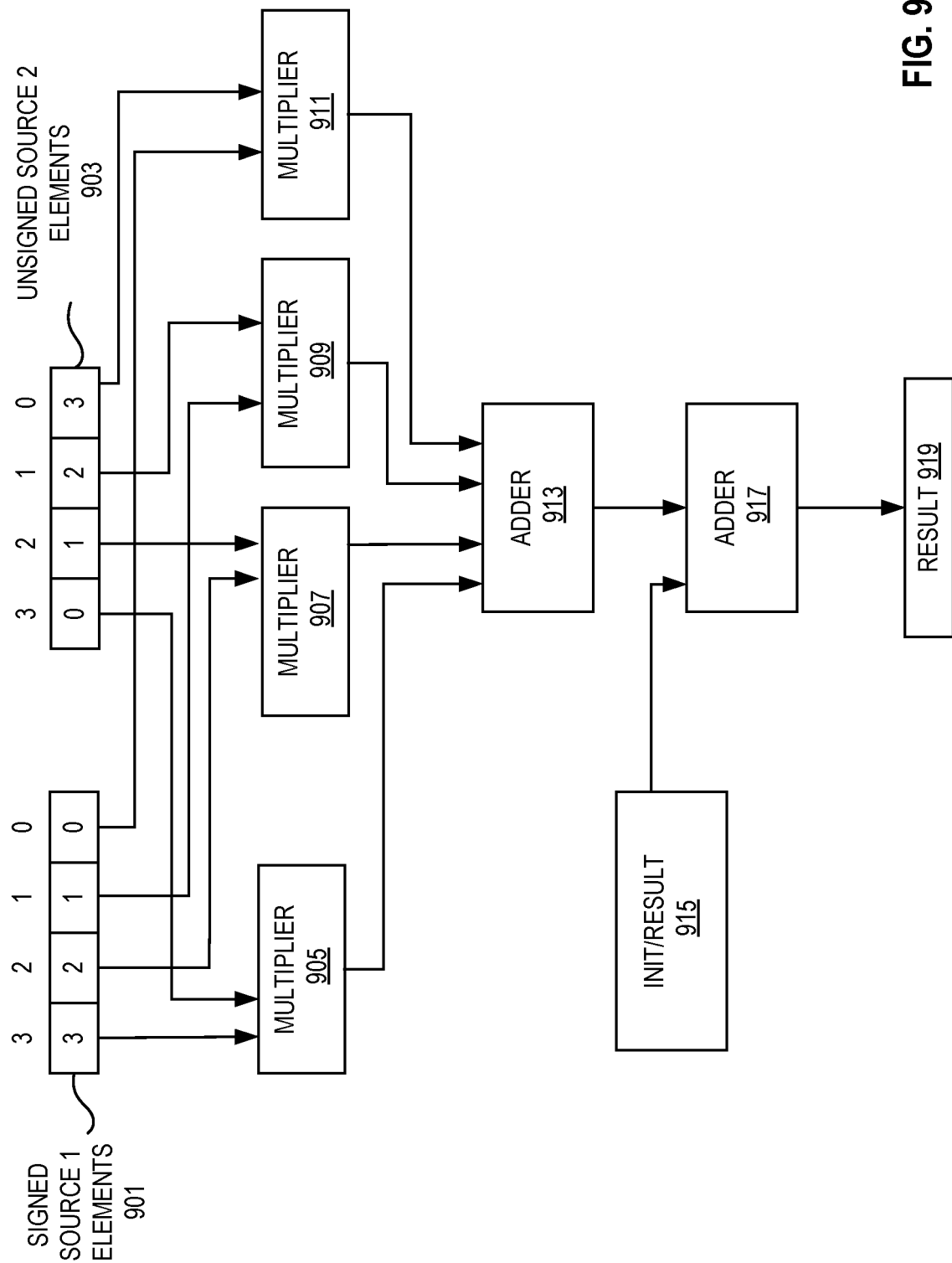
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating-point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating-point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
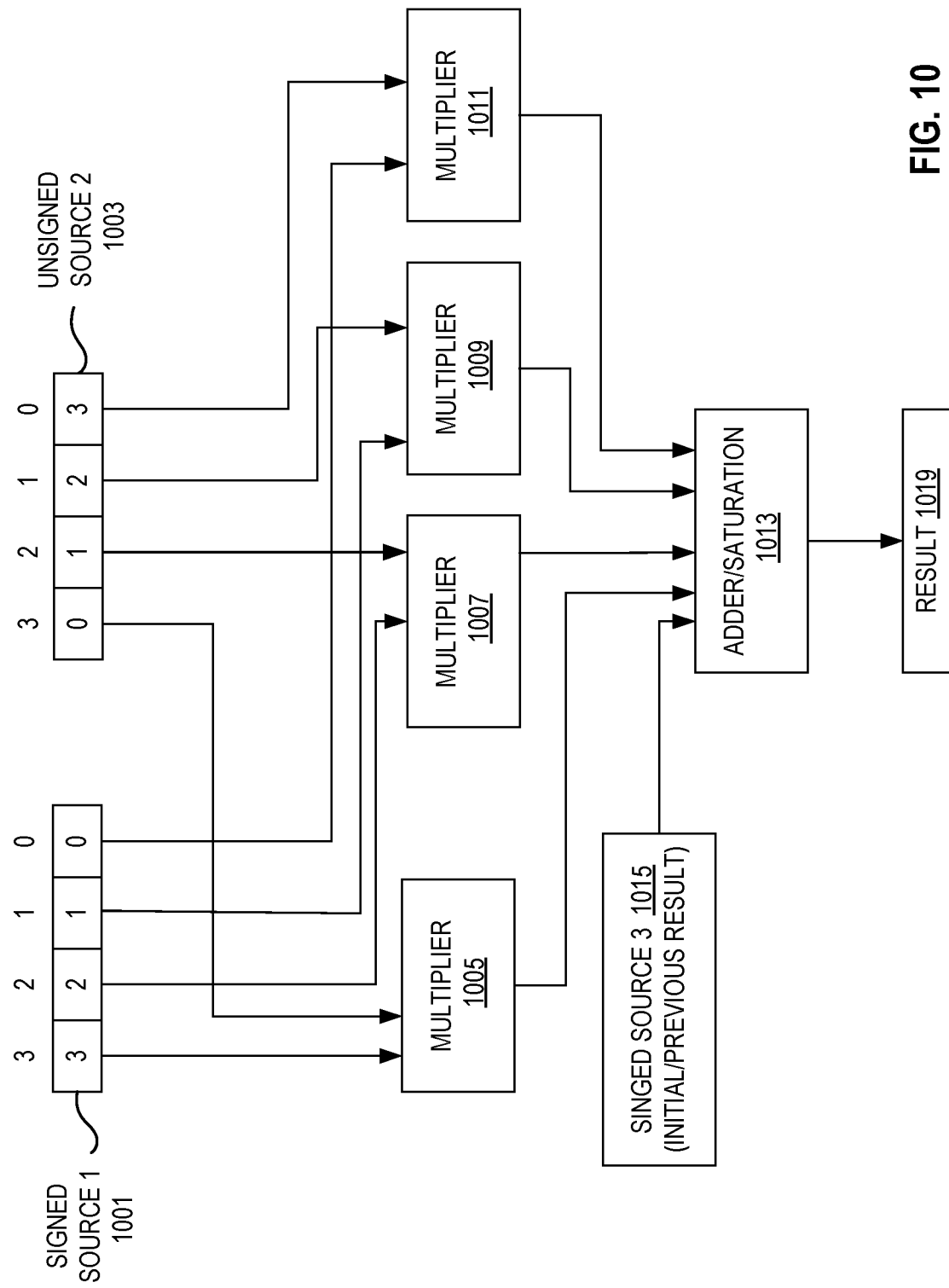
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating-point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating-point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
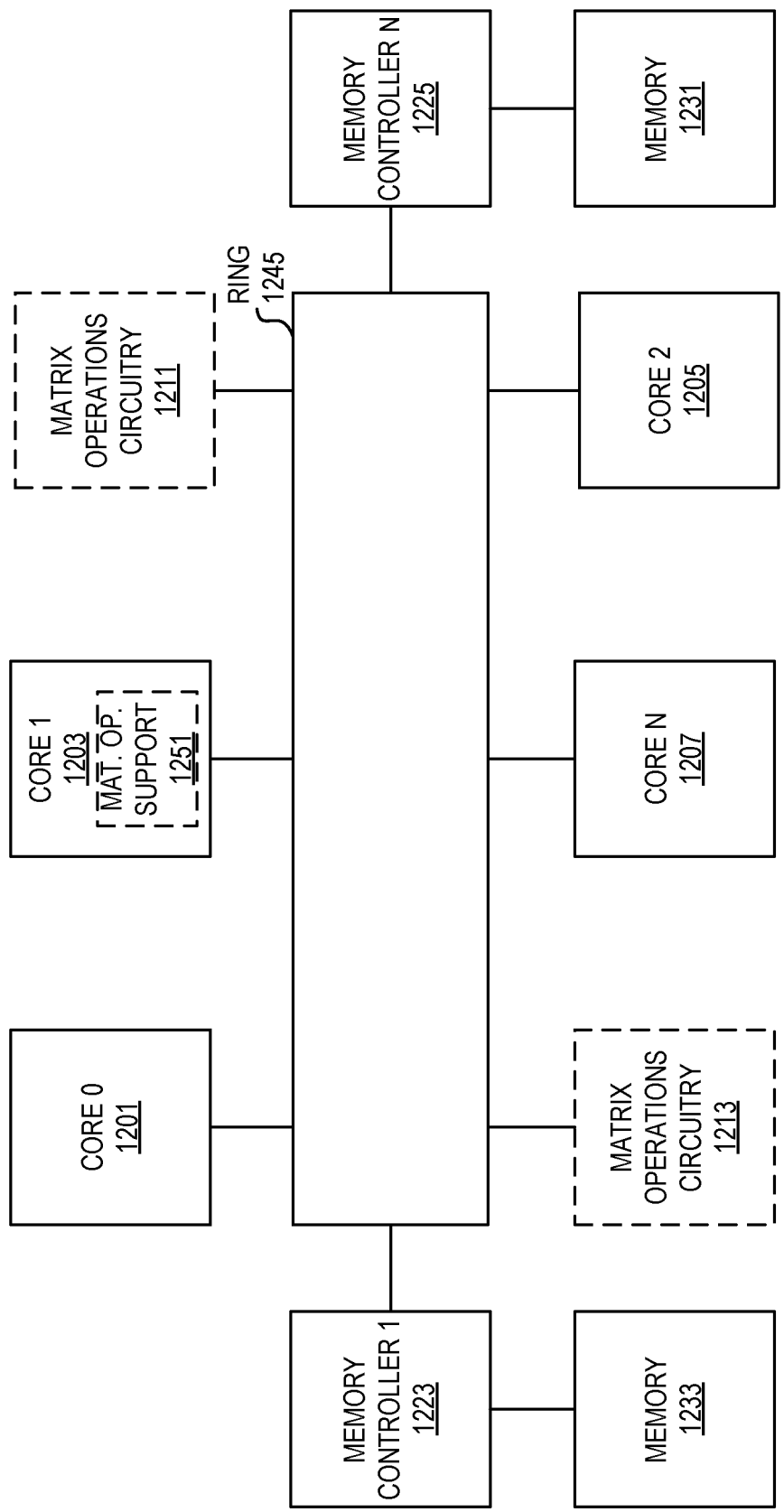
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitries 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
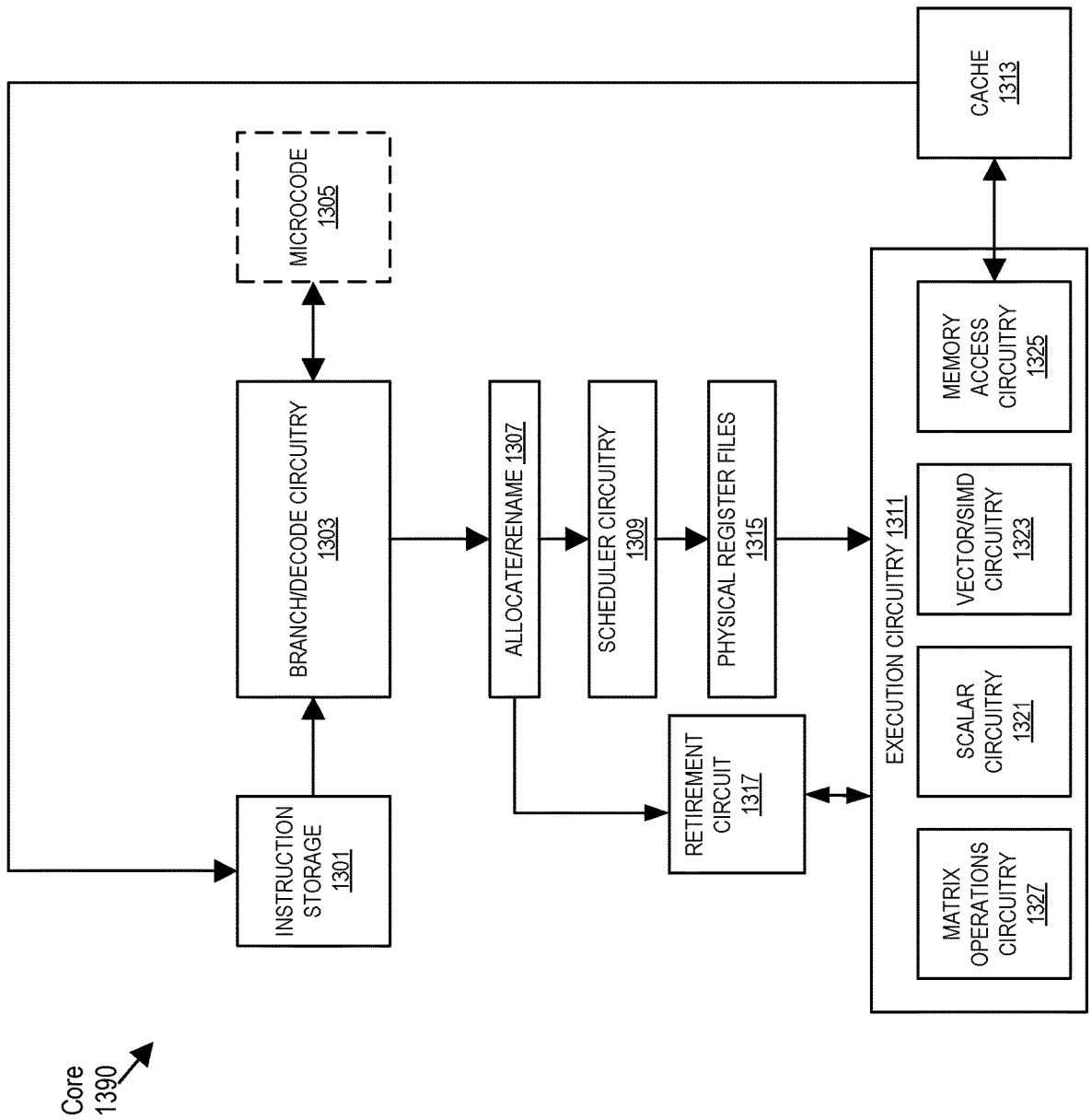
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
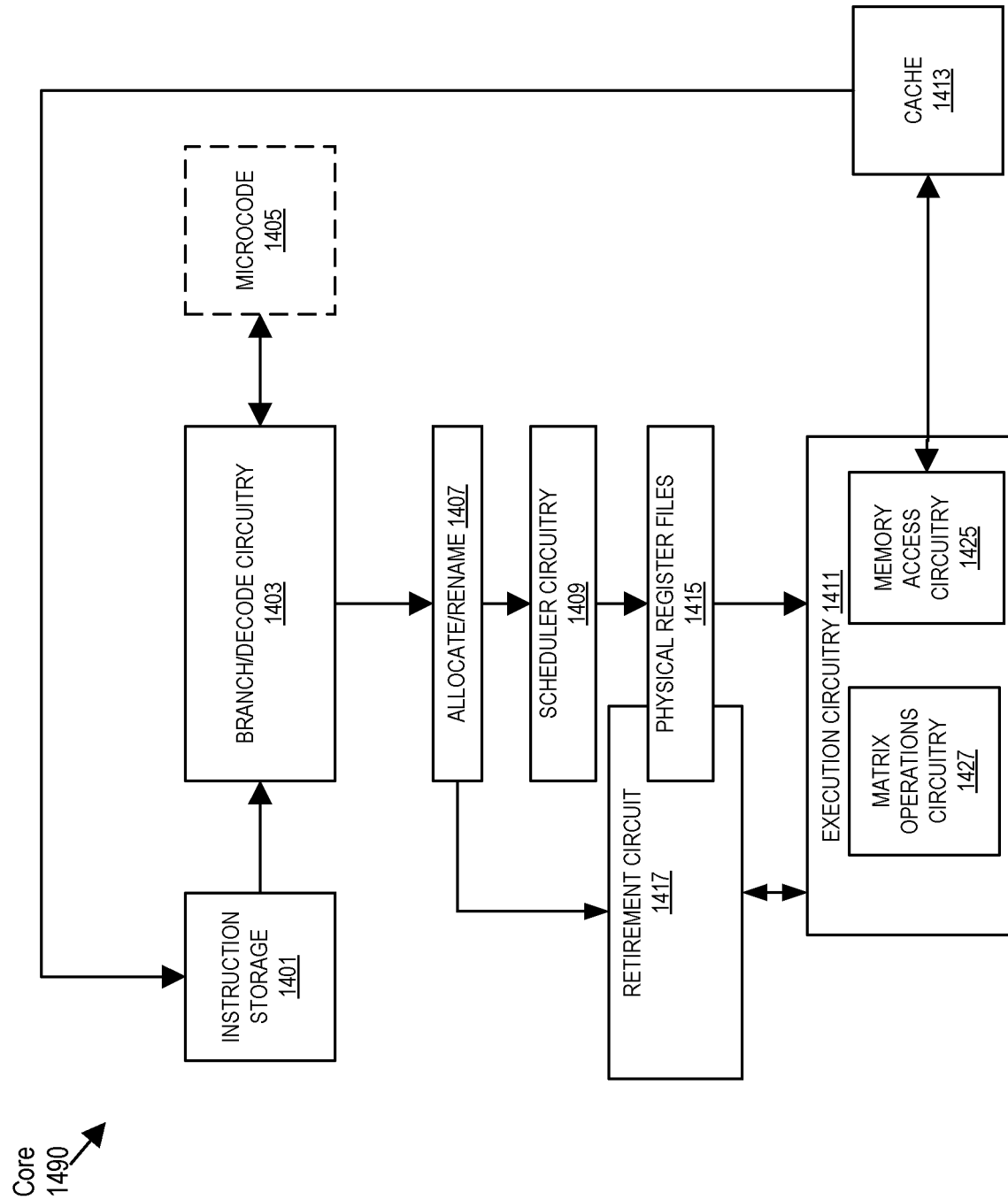
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformed matrix.

For example, if there are two column-major matrices to multiply:

| a b         | g i k       | ag + bh ai + bj ak + bl |
| c d *       | h j l =     | cg + dh ci + dj ck + dl |
| e f         |             | eg + fh ei + fj ek + fl |
| (3 × 2)     | (2 × 3)     | (3 × 3)                 |

The input matrices would be stored in linear memory (column-major) as:
a c e b d f
and
g h i j k l.
Reading those matrices as row-major with dimensions 2×3 and 3×2, they would appear as:

| a c e | and | g h |
| b d f |     | i j |
| k l   |     |     |

Swapping the order and matrix multiplying:

| g h |   | a c e   | ag + bh cg + dh eg + fh |
| i j | * | b d f = | ai + bj ci + dj ei + fj |
| k l |   |         | ak + bl ck + dl ek + fl |

The transform matrix is out and can then be stored in in row-major order:
ag+bh cg+dh eg+fh ai+bj ci+dj ei+fj ak+bl ck+dl ek+fl
and used in subsequent column major computations, it is the correct un-transformed matrix:

| ag + bh | ai + bj | ak + bl |
| cg + dh | ci + dj | ck + dl |
| eg + fh | ei + fj | ek + fl |

Exemplary Usage

FIG. 16 illustrates an example of usage of matrices (e.g., tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (e.g., tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
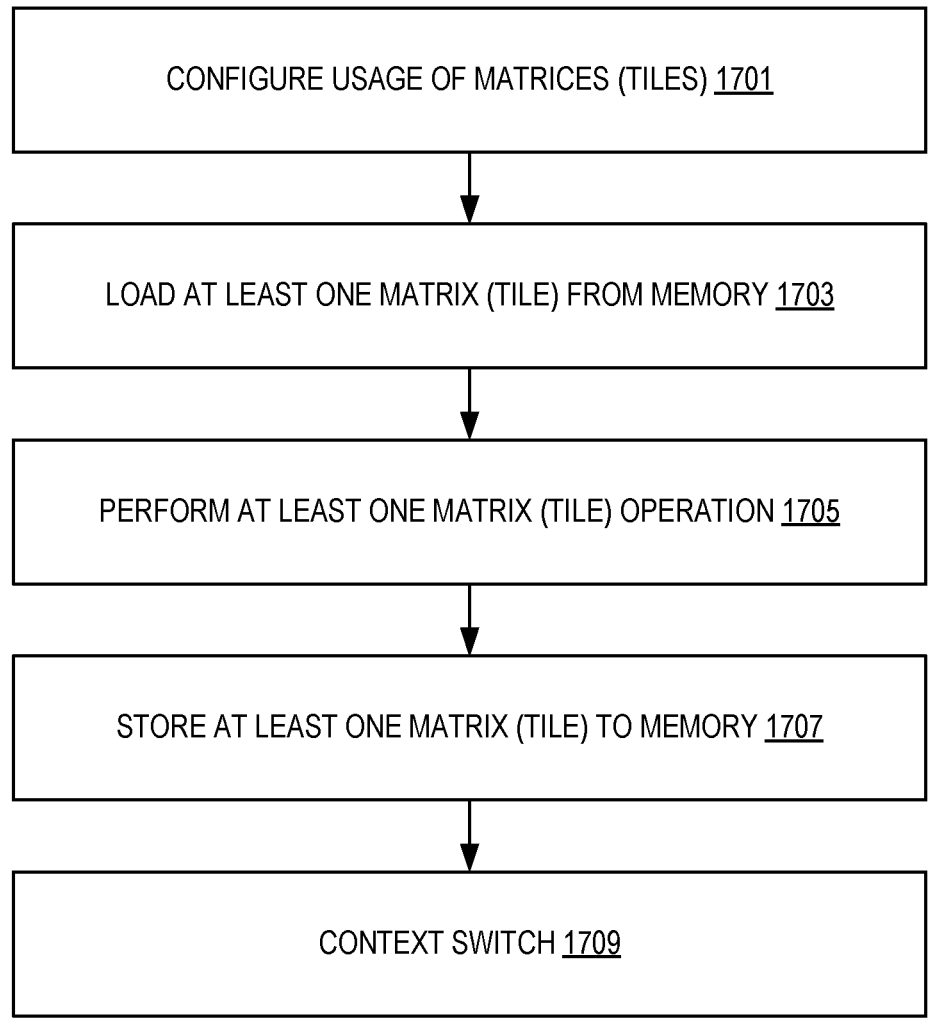
FIG. 17 illustrates an embodiment a method of usage of matrices (tiles)

FIG. 17 illustrates an embodiment of usage of matrices (e.g., tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (e.g., tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

Tile Usage Configuration

Figure 18:
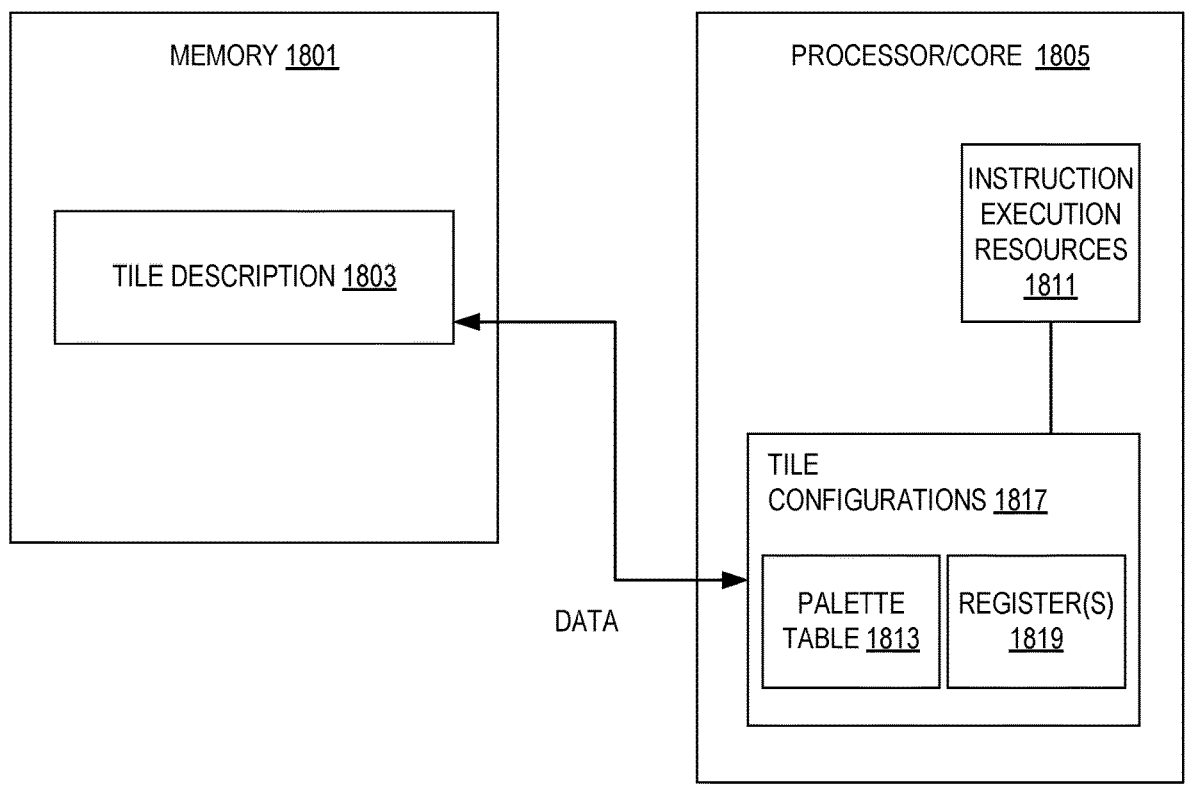
FIG. 18 illustrates support for configuration of the usage of tiles according to an embodiment.

FIG. 18 illustrates support for configuration of the usage of tiles according to an embodiment. A memory 1801 contains the tile description 1803 of the matrices (e.g., tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (e.g., tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked floating-point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

Exemplary Tile and Tile Configuration Storage

Figure 20A:
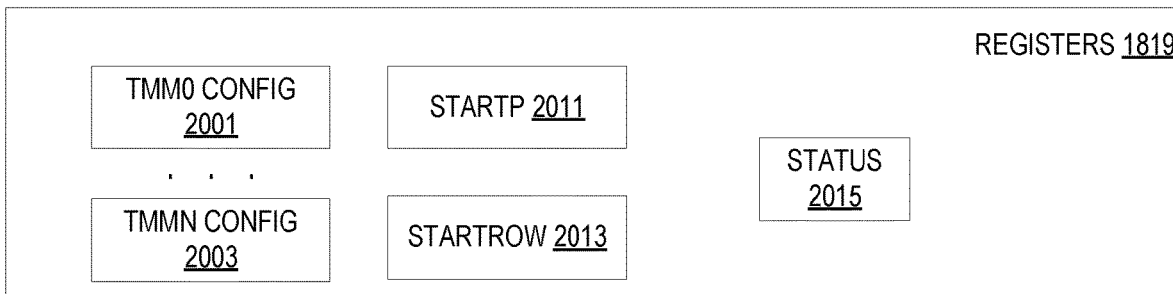
FIGS. 20(A)-(D) illustrate examples of register(s)

FIGS. 20(A)-(D) illustrate examples of register(s) 1819. FIG. 20(A) illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
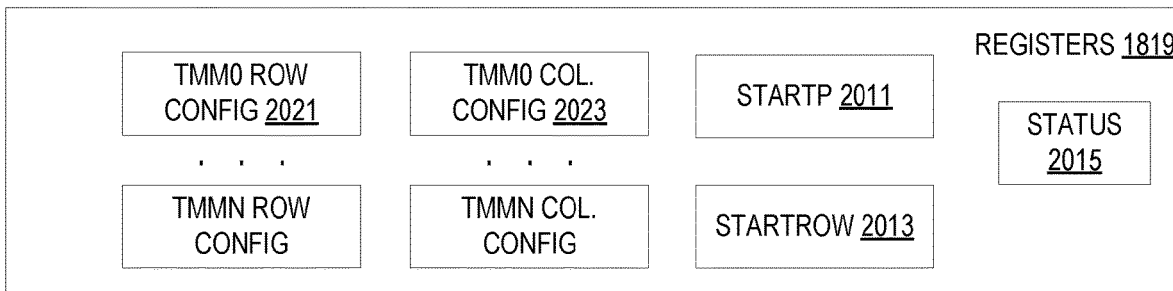

FIG. 20(B) illustrates a plurality of registers 1819. As shown each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:

FIG. 20(C) illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

Figure 21:
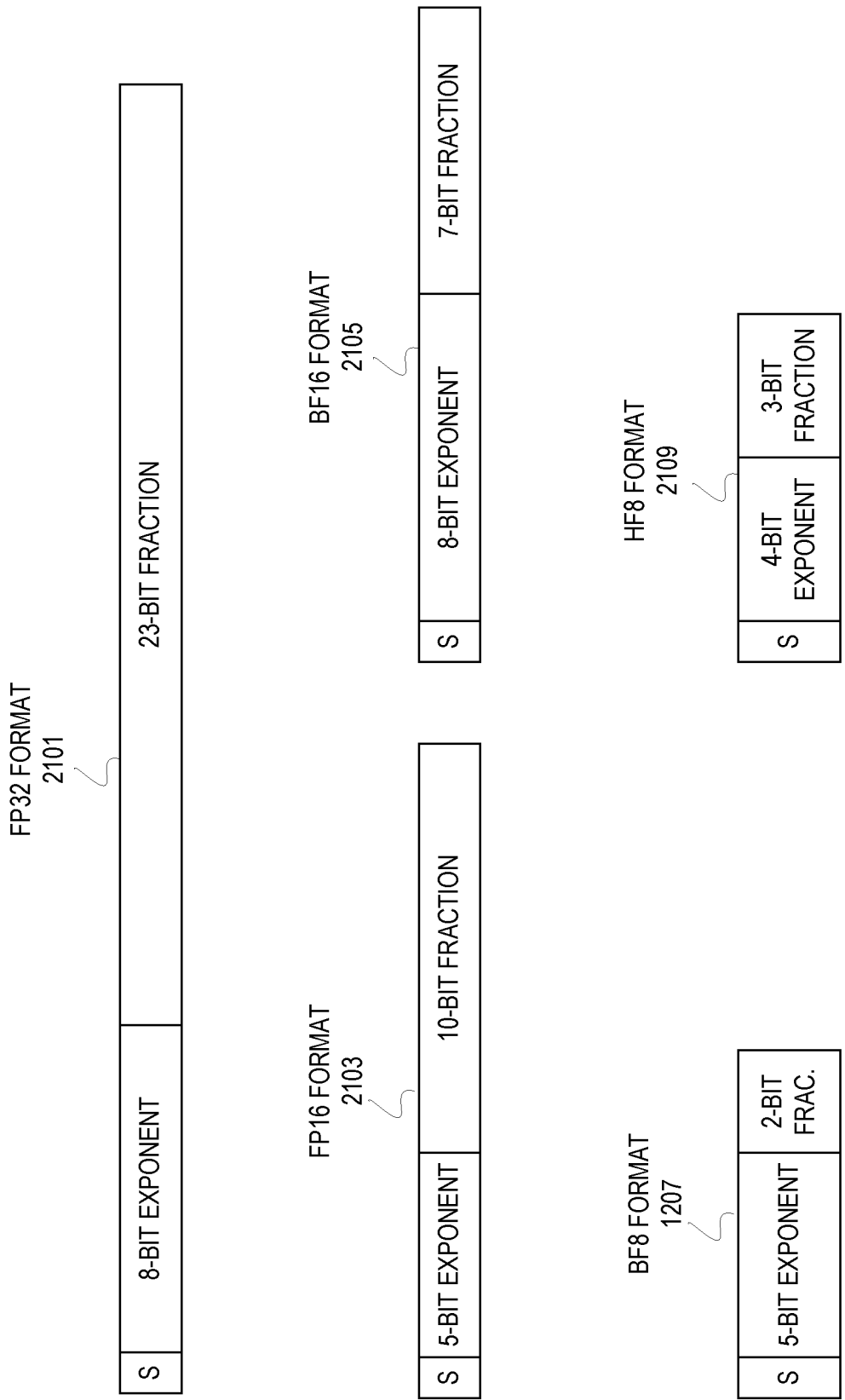
FIG. 21 different floating point representation formats.

FIG. 21 illustrates different floating point representation formats. In this illustration, the formats are in little endian format, however, in some embodiments, a big endian format is used. The FP32 format 2101 has a sign bit (S), an 8-bit exponent, and a 23-bit fraction (a 24-bit mantissa that uses an implicit bit). The FP16 format 2103 has a sign bit (S), a 5-bit exponent, and a 10-bit fraction. The BF16 format 2105 has a sign bit (S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

In some examples, an 8-bit floating point format (FP8) provides some advantages over a larger floating-point format. For example, an 8-bit floating point format may reduce pressure on memory and bandwidth used for machine learning (such as weights, activations, and gradient values used for training and/or inference of neural networks). As shown, the IEEE and BF16 formats have a fixed number of bits allocated to the fraction (or mantissa which is the fraction bits+1 bit) and exponent fields. Additionally, in some examples, a fixed exponent bias may be provided for a FP16 or BF16 number. As eight bits allows for a small number of mantissa and exponent bits than FP16 or BF16 it may be advantageous to have some variance in FP8 formats (e.g., ensure high accuracy and convergence when training machine learning models).

In machine learning, different parameters, namely weights, gradients and activations, have different precision and range requirements to achieve high training accuracy and/or convergence. This allows for different allocations of the number of exponent and fraction (mantissa bits) depending on the parameter being represented.

An example FP8 format is shown in 2107. In some examples, this is called a bfloat8-bit floating point (BF8) format. As shown, this format uses 1 bit for a sign, 5 bits for the exponent, and 2 bits for the fraction (or 1+2 bits for the mantissa). An example FP8 format is shown in 2109. In some examples, this is called a hybrid8-bit floating point (HF8) format. As shown, this format uses 1 bit for a sign, 4 bits for the exponent, and 3 bits for the fraction (or 1+3 bits for the mantissa).

Normalized numbers, subnormal (denormal) numbers, and zeroes are supported in both FP8 formats. In some examples, infinity and not-a-number (NaN) encodings are not supported, however, in some examples one or more are. In examples where infinities are not supported, a maximum exponent value is not reserved for encoding NaN and +/−infinity and just used to represent normalized floating-point numbers.

In examples where infinities and NaN are supported, they are mapped to 0x80. In some examples, for a NaN on an overflow, the value may be upconverted to IEEE754 NaN. In some examples, infinities and NaN raise exceptions for a hardware status register to delineate NaN from overflow.

In some examples, a zero is represented by an encoding with all zeroes the exponent and the fraction. Encodings with an all zero exponent and non-zero fraction represent denormal numbers. In the HF8 format, an exponent=$0000_2$ and mantissa=$000_2$ represents numerical value of zero, while exponent=$0000_2$ and mantissa=$001_2, 010_2, 011_2, 100_2, 101_2, 110_2$, and $111_2$ represent the denormal numbers. Similarly, in the BF8 format an exponent=$00000_2$ and mantissa=$00_2$ represents numerical value of zero, while exponent=$00000_2$ and mantissa=$01_2, 10_2$, and $11_2$ represent the denormal numbers.

In some examples, the FP8 formats utilize a variable exponential bias (e.g., a 6-bit unsigned integer value used as a bias). A bias skews the range of representable values more on the smaller numeric values at the expense of larger numerical values. In these examples, a numerical value of a normalized floating point number is $(1)^{sign} \times 2^{exponent-bias} \times 1$.mantissa and the numerical value of a denormal floating point number is $(1)^{sign} \times 2^{exponent-bias} \times 0$.mantissa. In some examples, the bias is provided by one or more packed data registers (e.g., SIMD or vector) where each data element position of the one or more packed data registers is to provides a bias value for a corresponding data element position of a source and/or destination. In some examples, the bias is provided by one or more general purpose registers where each general-purpose register provides a bias to be used for each data element of a particular source and/or destination. Note that in some examples, a single general-purpose register is used for a plurality of sources and/or destination. In some examples, the maximum bias is 16 for BF8 and 8 for HF8.

In some examples, not-a-number (NANs) and infinities are defined similarly to other IEEE floating points format, using an all-ones exponent. However, it is also acceptable in some examples to define versions of instructions that support other formats where "negative zero" is used to denote NANs and infinities, and the all-ones exponent is used to encode normal floating-point numbers.

In some examples, hardware support for FP8 supports one or more status (condition code) flags: invalid, denormal, overflow, and underflow. An arithmetic operation with a denormal operand will set the denormal exception flag, while an arithmetic operation with any NaN operand or no useful definable result will set the invalid exception flag. An arithmetic operation with a result that that overflows or underflows a destination will set the overflow and underflow exception flags respectively in some examples.

Recent work has also shown that 8-bit float point formats, such as BF8 (using a 1-5-2 format (1-bit sign, 5-bit exponent, and 2-bit fraction or a 1-4-3 format), are a viable option for input data for mixed precision computation such as fused multiply-add (FMA) with BF8 inputs and a FP32 accumulator. To prepare higher-precision outputs to be used as the next operation's inputs, in some embodiments, those outputs need to be converted/rounded to FP8 numbers. Using 8-bit floating-point format instead of single-precision in at least some matrix operations is expected to alleviate memory utilization and bandwidth issues while providing a non-trivial performance upside (e.g., on the order of 2×) even during the compute operation. Additionally, numerical accuracy studies have shown that the precision of the Deep Learning application is not compromised. However, extensive workload studies have shown, that from time to time its required to avoid classic round-to-nearest behavior during these down converts. Instead, a stochastic rounding operation is needed. Examples herein relate to conversion using a provided bias term, including variable in-place, $2^{nd}$ source merging and/or saturating.

Current experiments show bandwidth issues on the various cache levels and DRAM. So, as matrix compute capabilities speed up significantly (2×), the memory sub-systems capabilities only increase modestly due to reduce memory footprint. However, it has been found important to achieve convergence that FMAs accumulate into single-precision, IEEE float32. That means it may be important down-convert a result to FP8 after the operation completes.

In some examples, BF8-based operations support round to nearest even (RNE) and stochastic rounding. In some examples, HF8-based operations support round to nearest even (RNE) and stochastic rounding. In some examples, hybrid operations using both HF8 and BF8 are supported.

Detailed herein are instructions to accelerate matrix multiplication with "n:m structured sparsity"—a sparsity pattern with the property that there are at most n non-zeros out of each consecutive m elements. These instructions are herein called "sparsity FMA" instructions. These instructions operate on different data type formats. Specifically, in some embodiments, a 4:8 structured sparsity for 8-bit datatypes (e.g., BF8 or HF8).

In some examples, the instructions operate on two "A" tiles with dense data (one for "odd" elements and one for "even" elements), a first "B" tile which represents two 4:8 structured-sparse tiles compressed into one tile and a second "B" tile with sparsity controls (bit per B element in the non-compressed representation) and a "C" source/destination tile. IN some examples, the single extended "A" tile is used. Every individual dot product involves 64 bits from "A" and 32 bits from "B." In the FP8 case, 4 8-bit elements are selected out of the eight from both "A" tiles are dot-product multiplied with 4 first "B" tile elements from a corresponding 32-bit chunk. Note that the results of the dot products multiplications are added and then accumulated into a corresponding row and column of "C."

Figure 22:
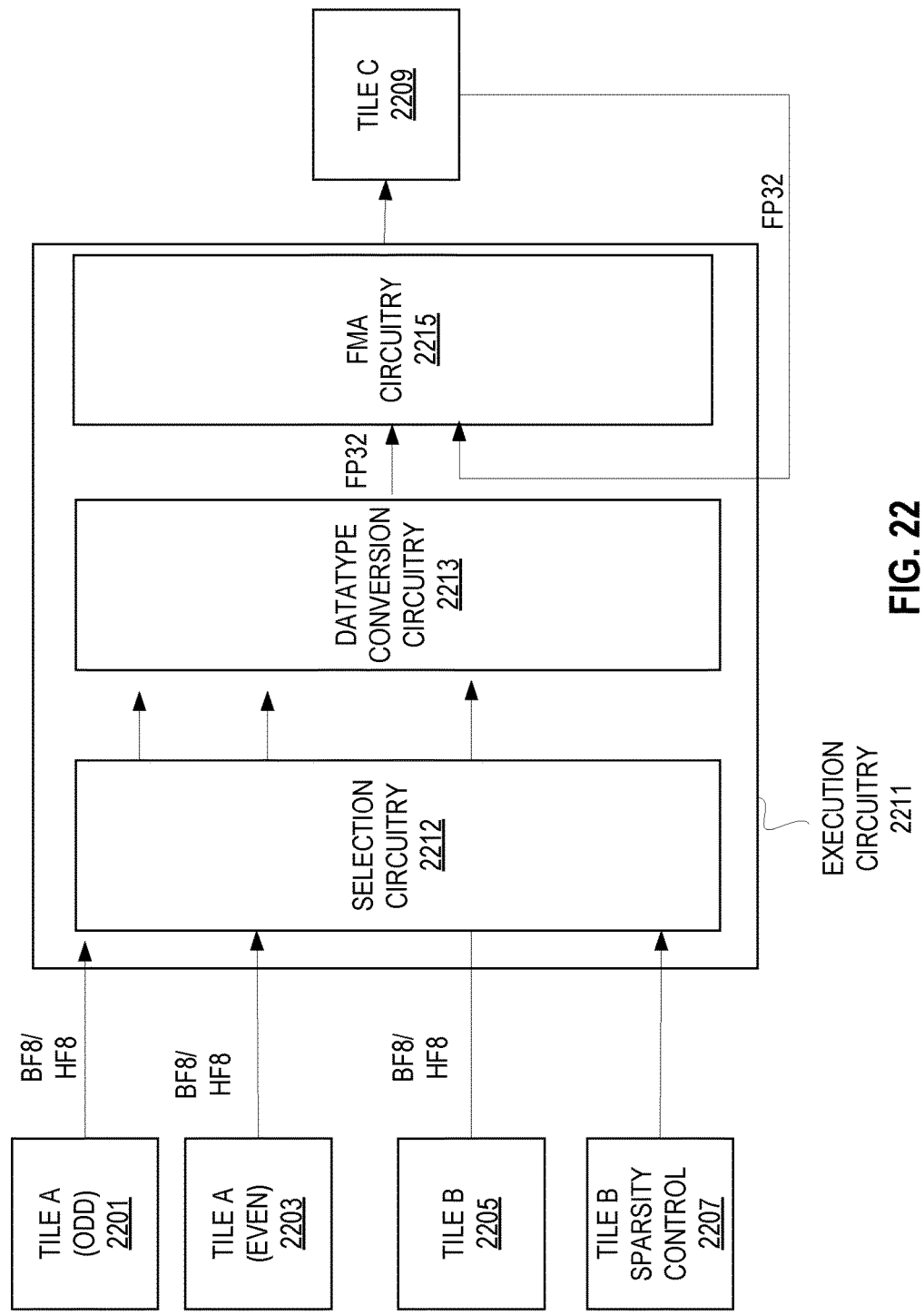
FIG. 22 illustrates examples of hardware support for executing sparsity FMA instructions.

FIG. 22 illustrates examples of hardware support for executing sparsity FMA instructions. In particular, this illustrates support for one or more sparsity FMA instructions to perform a dot product and accumulation. Note that tile "A" refers to TSRC1+1 (two source tiles with only one needing to be explicitly indicated—the second source tile is usually either logically one higher (e.g., TSRC1=5, TSRC1+1=6), or logically one lower), tile "B" refers to TSRC2+1 (similarly only indicates a single tile), and tile "C" refers to a source/destination tile.

An embodiment of a format for sparsity FMA instruction is TDPS[X]BF8PS TSRCDST, TSRC1+1, TSRC2+1. In some embodiments, TDPS[X]BF8PS is the opcode mnemonic of the instruction and indicates an FMA using BF8 data elements from TSRC1+1. TSRCDST is indicated by one or more fields for a tile operand. TSRC1+1 and TSRC2+1 are indicated by one or more fields for the tile sources. In some embodiments, the destination is encoded using one or more fields for ModRM:reg(w) and the source is encoded using one or more fields for ModRM:r/m(r). In some embodiments, the instruction uses prefix 3501(C).

An embodiment of a format for sparsity FMA instruction is TDPS[X]HF8PS TSRCDST, TSRC1+1, TSRC2+1. In some embodiments, TDPS[X]HF8PS is the opcode mnemonic of the instruction and indicates an FMA using HF8 data elements from TSRC1+1. TSRCDST is indicated by one or more fields for a tile operand. TSRC1+1 and TSRC2+1 are indicated by one or more fields for the tile sources. In some embodiments, the destination is encoded using one or more fields for ModRM:reg(w) and the source is encoded using one or more fields for ModRM:r/m(r). In some embodiments, the instruction uses prefix 3501(C).

Others embodiment of a format for sparsity FMA instruction is TDPS[X]BF8HF8PS TSRCDST, TSRC1+1, TSRC2+1 (where the sources are different types (e.g., TSRC1 is BF8 and TSRC2 is HF8)) and TDPS[X] HF8BF8PS TSRCDST, TSRC1+1, TSRC2+1 (where the sources are different types (e.g., TSRC1 is HF8 and TSRC2 is BF8))

In some examples, the opcode is provided by at least field 3503, TSRCDST field is provided by at least field 3644, the first source is provided by at least bits VVVV of one of 3905, 3917, or 4017, and the source is provided by at least 3646. In some examples, the opcode is provided by at least field 3503, DST field is provided by at least field 3644, the source is provided by at least bits VVVV of one of 3905, 3917, or 4017, and the second source is provided by at least 3646 and/or the SIB byte 3604. In some examples, a bias is provided by register or memory location (such as provided by at least 3646 and/or the SIB byte 3604).

Exemplary operand sizes include, but are not limited to 64-bit, 128-bit, 256-bit, 512-bit, and 1024-bit. The [X] indicates that a bias may be applied. The bias may be dynamic and provided by a second source such as a second register.

The two "A" tiles 2101 and 2103, "B" tile 2105, and "C" tile 2109 are fed, as sources, into execution 2111 to perform a FMA using these sources. Sparsity control values from tile "B" sparsity control 2107 are used to select which data elements from the two "A" tiles 2101 and 2103 are to be used in the FMA using selection circuitry 2112. The selected data elements from the two "A" tiles 2101 and 2103 undergo a datatype conversion (e.g., from FP8 to FP32) using datatype conversion circuitry 2113.

Examples of pseudocode representing actions the conversion by the datatype conversion circuitry 2113 take are detailed below. In these examples, the conversion allows for a variable bias. However, not that having a variable bias is may not be in all examples. The "null" represents how NaN is to be treated in some examples.

```
convert_bf8_to_fp32( in, BF8, exp-bias, null )
    f32_bias = 0d127;
    bf8_bias = 0d15;
    s = ( in & 0x80 ) << 24; // sign
    e = ( in & 0x7c ) >> 2; // exponent
    f = ( in & 0x03 ); //* fraction */
    e_norm = e + (f32_bias – bf8_bias); // e+0x0111.0000
    res = { 0 };
/* convert subnormal denormal fp8 number into a normal fp32 number */
    Frc_width = 2; // frc_width = 2 for BF8
    if ( (e == 0) && (f != 0) ) {
        // conditional return of 1 or lz_cnt
        lz_cnt = ( f > 0x1 ) ? 1 : Frc_width;
        e_norm = e_norm – lz_cnt + 1; // normalized exponent
        f = (f << lz_cnt) & 0x03; /* fixed it. Shift count == lz_cnt */
    }
/* zero */
else if ( (e == 0) && (f == 0) ) {
    e_norm = 0;
}
/* nan and inf */
else if ( e == 0x1f ) {
    e_norm = 0xff;
    f |= ( f == 0 ) ? 0 : 0x02; /* making first fraction bit 1. Bitwise OR
    */
}
    /* set result to 0 */
    res = 0x0;
    /* set exp and fract */
    res |= (e_norm << 23);
    res |= (f << 21);
    /* sign it */
    res |= s;
    return res; // return as floating point
convert_hf8_to_fp32( in, HF8, exp-bias, null )
```

-continued

```
    f32_bias = 0d127;
    hf8_bias = 0d7;
    s = ( in & 0x80 ) << 24;
    e = ( in & 0x78 ) >> 3;
    f = ( in & 0x07 );
    e_norm = e + (f32_bias - hf8_bias); // e+0d120
    res = { 0 };
    /* convert denormal hf8 number into a normal fp32 number */
    Frc_width = 3;   // frc_width =3 for HF8
    if ( (e == 0) && (f != 0) ) {
        lz_cnt = case (f)
            '1--:                            1;
            '01-:                            2;
            '001:                            3;
        e_norm = e_norm - lz_cnt + 1;
        f = (f << (lz_cnt)) & 0x07;
    }
else if ( (e == 0) && (f == 0) ) {
        e_norm = 0;
    }
else if ( e == 0xf ) {
        e_norm = 0xff;
        f |= ( f == 0 ) ? 0 : 0x04; /* making first fraction bit 1.Bitwise OR */
    }
    /* set result to 0 */
    res = 0x0;
    /* set exp and fract */
    res |= (e_norm << 23);
    res |= (f << 20);
    /* sign it */
    res |= s;
    return res;
```

The FMA circuitry 2115 takes the selected and converted data elements from "A" and performs dot-product multiplications with the "B" tile elements from a corresponding 32-bit chunk. The results of the dot products multiplications are added and then accumulated into a corresponding row and column of "C" 2109.

Figure 23:
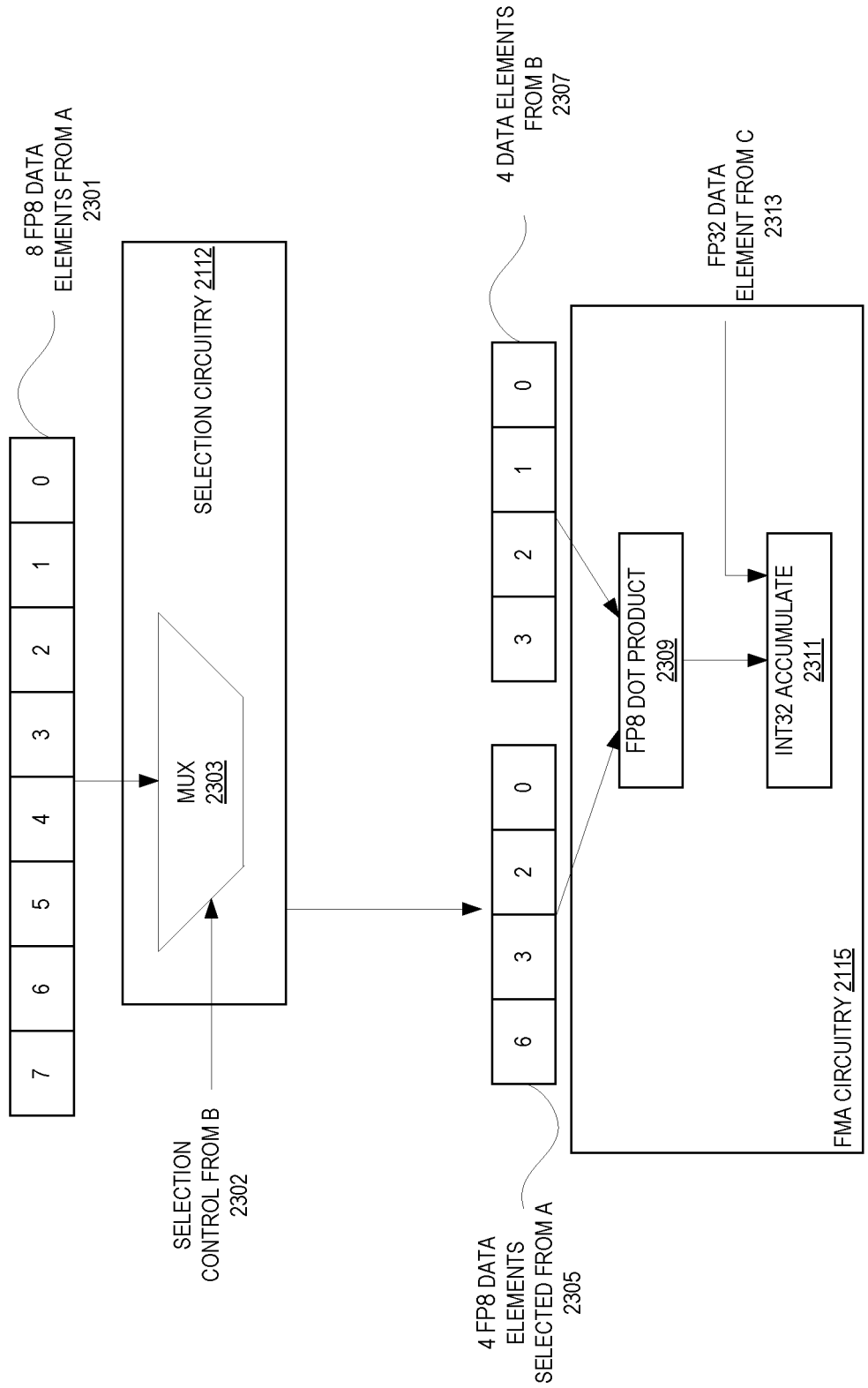
FIG. 23 illustrates examples of an FMA using FP8 data elements.

FIG. 23 illustrates examples of an FMA using FP8 data elements. This FMA may be performed using execution circuitry 2111. In this example, 8 FP8 data elements from an "A" tile 2301. Selection control information 2302 from a "B" tile (e.g., tile "B" sparsity control 2107) is used by a multiplexer 2303 to select a proper subset of the 8 FP8 data elements.

The selected proper subset of 4 FP8 data elements from "A" and 4 FP8 data elements from "B" 2307 are fed to FMA circuitry 2115 such as to a FP8 dot product circuit 2309 and the result of the dot product multiplication and addition is fed accumulated in an FP8 accumulator 2311 with a FP32 data element from C 2313.

FIG. 24 illustrates examples of sparsity control tiles. As noted, sparsity controls, are used to select the elements from "A" are in one of the two "B" tiles. For the FP8 case, every row in the sparsity controls tile will hold controls for 4 B rows as shown in sparsity control tile for FP8 2401. In some embodiments, the split is according to a maximum bytes per row (colsb) value found in the palette.

FIG. 25 illustrates examples of a method to process a sparsity FMA instruction. For example, a processor core as shown herein, a pipeline as detailed below, etc. performs aspects of this method.

At 2501, an instance of a single instruction having one or more fields for an opcode, one or more fields to identify a source/destination matrix (tile) operand, one or more fields to identify a first plurality of source matrix (tile) operands, one or more fields to identify a second plurality of matrix (tile) operands, wherein the opcode is to indicate that execution circuitry is to select a proper subset of fp8 data elements from the first plurality of source matrix (tile) operands based on sparsity controls from a first matrix (tile) operand of the second plurality of matrix (tile) operands, for each element position of the source/destination matrix (tile), convert pairs of fp8 elements, as selected, from a row of the first source matrices and pairs of fp8 elements from a column of one of the second source matrices to fp32, multiply converted even FP8 elements from the two specified source matrices to generate a first product and separately multiply converted odd FP8 elements from the specified source matrices to generate second product, and accumulate the first and second products with previous contents of the source/destination matrix (tile) is fetched.

In some embodiments, the fetched instruction of the first instruction set is translated into one or more instructions of a second, different instruction set at 2502. This translation may be done in hardware, software, or a combination thereof. Note the translation may be from a tile instruction to one or more vector (SIMD) instructions such that vector (SIMD) hardware performs the execution.

The instance of the single instruction, or the one or more translated instructions of the second, different instruction set, is/are decoded at 2503. In some embodiments, the translation and decoding are merged.

Data values associated with the source operands of the decoded instruction are retrieved and the instruction is scheduled at 2505. For example, when one or more of the source operands are memory operands, the data from the indicated memory location is retrieved. Note that in some embodiments, the scheduling includes sending a command to an accelerator to perform the operation(s) according to the opcode of the instance of the single instruction.

At 2507, the decoded instruction(s) is/are executed by execution circuitry (hardware) such as that detailed herein. The execution circuitry may be in a processor core or in an accelerator external to a processor core. In some embodiments, the execution circuitry is configured such one or more conditions of: denormals are treated as zero (DAZ), flush to zero (FTZ) is used (denormal results are set to zero), round to nearest even (RNE) rounding is used, and/or all exceptions are suppressed (SAE). Note the execution circuitry may be in an accelerator and a command sent to the accelerator based on the decoded instruction. In some embodiments, unused rows of the source/destination matrix (tile) operand are zeroed. Examples of conversion of FP8 have been discussed. In some examples, the first and second source use different types of FP8 values (e.g., one uses BF8 and the other uses HF8).

In some embodiments, the instruction is committed or retired at 2509.

FIG. 26 illustrates examples of a method to process a sparsity FMA instruction. For example, a processor core as shown herein, a pipeline as detailed below, etc. performs aspects of this method.

At 2601, an instance of a single instruction having one or more fields for an opcode, one or more fields to identify a source/destination matrix (tile) operand, one or more fields to identify a first plurality of source matrix (tile) operands, one or more fields to identify a second plurality of matrix (tile) operands, wherein the opcode is to indicate that execution circuitry is to select a proper subset of fp8 data elements from the first plurality of source matrix (tile) operands based on sparsity controls from a first matrix (tile) operand of the second plurality of matrix (tile) operands, for each element position of the source/destination matrix (tile), multiply selected even fp8 elements from the two specified source matrices to generate a first product and separately multiply selected odd fp8 elements from the specified source matrices to generate second product, and accumulate the first and second products with previous contents of the source/destination matrix (tile) is fetched.

In some embodiments, the fetched instruction of the first instruction set is translated into one or more instructions of a second, different instruction set at 2602. This translation may be done in hardware, software, or a combination thereof. Note the translation may be from a tile instruction to one or more vector (SIMD) instructions such that vector (SIMD) hardware performs the execution.

The instance of the single instruction, or the one or more translated instructions of the second, different instruction set, is/are decoded at 2603. In some embodiments, the translation and decoding are merged.

Data values associated with the source operands of the decoded instruction are retrieved and the instruction is scheduled at 2605. For example, when one or more of the source operands are memory operands, the data from the indicated memory location is retrieved. Note that in some embodiments, the scheduling includes sending a command to an accelerator to perform the operation(s) according to the opcode of the instance of the single instruction.

At 2607, the decoded instruction(s) is/are executed by execution circuitry (hardware) such as that detailed herein. The execution circuitry may be in a processor core or in an accelerator external to a processor core. In some embodiments, the execution circuitry is configured such one or more conditions of: denormals are treated as zero (DAZ), flush to zero (FTZ) is used (denormal results are set to zero), round to nearest even (RNE) rounding is used, and/or all exceptions are suppressed (SAE). Note the execution circuitry may be in an accelerator and a command sent to the accelerator based on the decoded instruction. In some embodiments, unused rows of the source/destination matrix (tile) operand are zeroed. Examples of conversion of FP8 have been discussed. In some examples, the first and second source use different types of FP8 values (e.g., one uses BF8 and the other uses HF8).

In some embodiments, the instruction is committed or retired at 2609.

FIG. 27 illustrates exemplary pseudocode for a TDPS[X] BF8PS instruction. Note that while the code indicates a serial approach, in some embodiments, this is merely a logical construct and at least a proper subset of data elements of tiles are operated on in parallel. Additionally, note that the code uses Java operators such as % for a remainder operation. Note example conversion descriptions have been provided previously.

FIG. 28 illustrates exemplary pseudocode for a TDPS[X] HF8PS instruction. Note that while the code indicates a serial approach, in some embodiments, this is merely a logical construct and at least a proper subset of data elements of tiles are operated on in parallel. Additionally, note that the code uses Java operators such as % for a remainder operation. Note example conversion descriptions have been provided previously.

Figure 29:
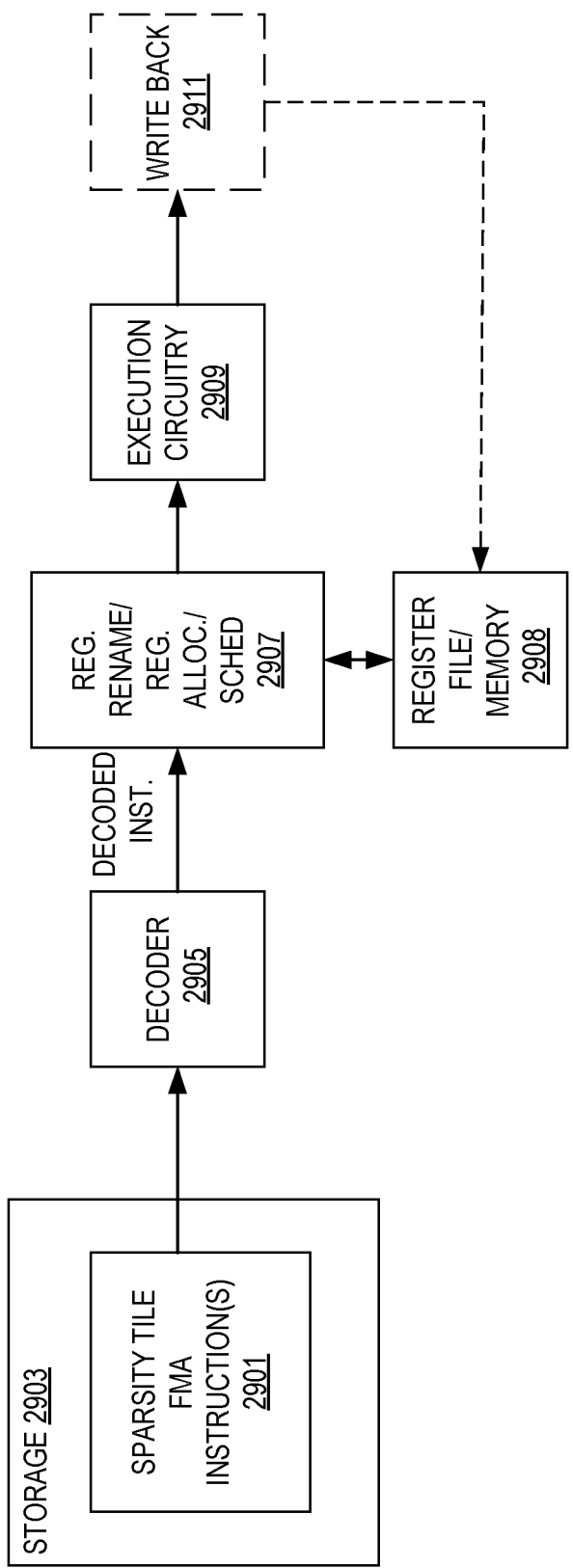
FIG. 29 illustrates examples of hardware to process an instance of a single instruction such as one of the sparsity FMA instructions.

FIG. 29 illustrates examples of hardware to process an instance of a single instruction such as one of the sparsity FMA instructions. As illustrated, storage 2903 stores at least one of the sparsity FMA instructions 2901 to be executed.

The instruction 2901 is received by decode circuitry 2905. For example, the decode circuitry 2905 receives this instruction from fetch logic/circuitry. The instruction includes fields for an opcode, explicit first and second tile sources, and a source/destination. Note the decode circuitry 2905 is capable of decoding other instructions.

More detailed embodiments of at least one instruction format will be detailed later. The decode circuitry 2905 decodes the instruction into one or more operations. In some embodiments, this decoding includes generating a plurality of micro-operations to be performed by execution circuitry (such as execution circuitry 2909). The decode circuitry 2905 also decodes instruction prefixes.

In some embodiments, register renaming, register allocation, and/or scheduling circuitry 2907 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 2908 store data as operands of the instruction to be operated on by execution circuitry 2909. Exemplary register types include packed data registers, general purpose registers, tile, and floating-point registers.

Execution circuitry 2909 executes the decoded instruction according to the opcode of the instance of the single instruction. Example detailed execution circuitry is shown at least FIGS. 21, 32, etc. Note the execution circuitry may be in an accelerator and a command sent to the accelerator based on the decoded instruction.

In some embodiments, retirement/write back circuitry 2911 architecturally commits the destination register into the registers or memory 2908 and retires the instruction.

The instructions detailed above may be used in a variety of computer architectures and environments, utilize one or more instruction formats, etc. Examples of architectures, formats, etc. that support these instructions are detailed below.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 30:
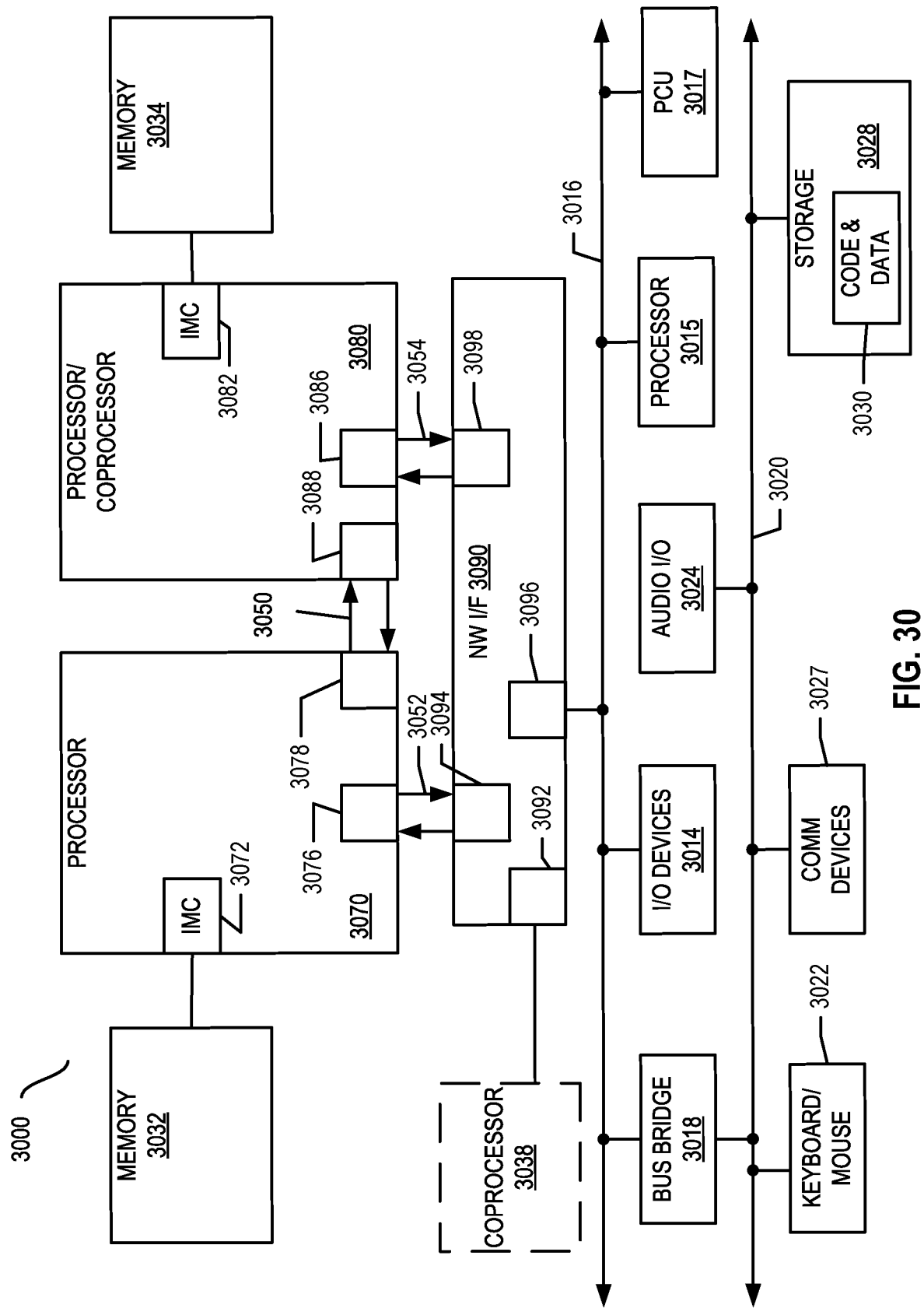
FIG. 30 illustrates an example computing system.

FIG. 30 illustrates an example computing system. Multiprocessor system 3000 is an interfaced system and includes a plurality of processors or cores including a first processor 3070 and a second processor 3080 coupled via an interface 3050 such as a point-to-point (P-P) interconnect, a fabric, and/or bus. In some examples, the first processor 3070 and the second processor 3080 are homogeneous. In some examples, first processor 3070 and the second processor 3080 are heterogenous. Though the example system 3000 is shown to have two processors, the system may have three or more processors, or may be a single processor system. In some examples, the computing system is a system on a chip (SoC).

Processors 3070 and 3080 are shown including integrated memory controller (IMC) circuitry 3072 and 3082, respectively. Processor 3070 also includes interface circuits 3076 and 3078; similarly, second processor 3080 includes interface circuits 3086 and 3088. Processors 3070, 3080 may exchange information via the interface 3050 using interface circuits 3078, 3088. IMCs 3072 and 3082 couple the processors 3070, 3080 to respective memories, namely a memory 3032 and a memory 3034, which may be portions of main memory locally attached to the respective processors.

Processors 3070, 3080 may each exchange information with a network interface (NW I/F) 3090 via individual interfaces 3052, 3054 using interface circuits 3076, 3094, 3086, 3098. The network interface 3090 (e.g., one or more of an interconnect, bus, and/or fabric, and in some examples is a chipset) may optionally exchange information with a coprocessor 3038 via an interface circuit 3092. In some examples, the coprocessor 3038 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 3070, 3080 or outside of both processors, yet connected with the processors via an interface such as P-P interconnect, such that either or both processors' local cache information may be stored in the shared cache if a processor is placed into a low power mode.

Network interface 3090 may be coupled to a first interface 3016 via interface circuit 3096. In some examples, first interface 3016 may be an interface such as a Peripheral Component Interconnect (PCI) interconnect, a PCI Express interconnect or another I/O interconnect. In some examples, first interface 3016 is coupled to a power control unit (PCU) 3017, which may include circuitry, software, and/or firmware to perform power management operations with regard to the processors 3070, 3080 and/or co-processor 3038. PCU 3017 provides control information to a voltage regulator (not shown) to cause the voltage regulator to generate the appropriate regulated voltage. PCU 3017 also provides control information to control the operating voltage generated. In various examples, PCU 3017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 3017 is illustrated as being present as logic separate from the processor 3070 and/or processor 3080. In other cases, PCU 3017 may execute on a given one or more of cores (not shown) of processor 3070 or 3080. In some cases, PCU 3017 may be implemented as a microcontroller (dedicated or general-purpose) or other control logic configured to execute its own dedicated power management code, sometimes referred to as P-code. In yet other examples, power management operations to be performed by PCU 3017 may be implemented externally to a processor, such as by way of a separate power management integrated circuit (PMIC) or another component external to the processor. In yet other examples, power management operations to be performed by PCU 3017 may be implemented within BIOS or other system software.

Various I/O devices 3014 may be coupled to first interface 3016, along with a bus bridge 3018 which couples first interface 3016 to a second interface 3020. In some examples, one or more additional processor(s) 3015, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 3016. In some examples, second interface 3020 may be a low pin count (LPC) interface. Various devices may be coupled to second interface 3020 including, for example, a keyboard and/or mouse 3022, communication devices 3027 and storage circuitry 3028. Storage circuitry 3028 may be one or more non-transitory machine-readable storage media as described below, such as a disk drive or other mass storage device which may include instructions/code and data 3030 and may implement the storage 'ISAB03 in some examples. Further, an audio I/O 3024 may be coupled to second interface 3020. Note that other architectures than the point-to-point architecture described above are possible. For example, instead of the point-to-point architecture, a system such as multiprocessor system 3000 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 31:
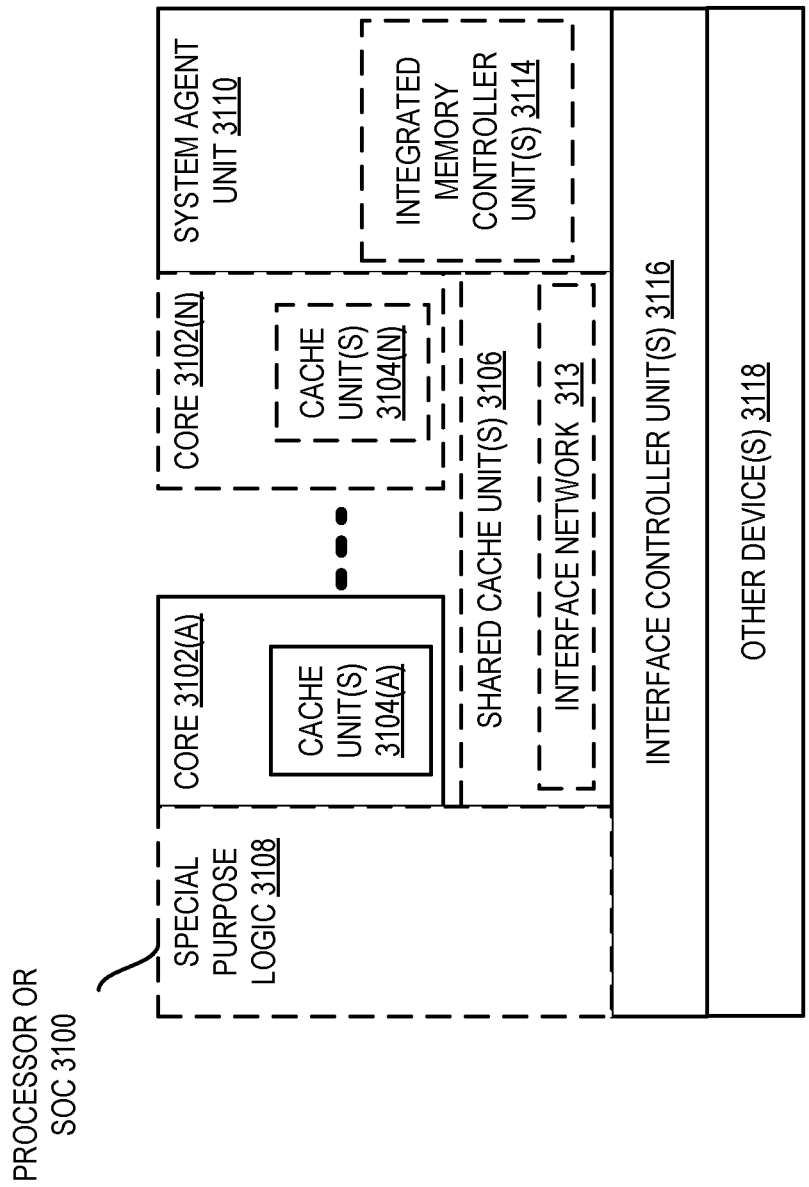
FIG. 31 illustrates a block diagram of an example processor and/or System on a Chip (SoC) that may have one or more cores and an integrated memory controller.

FIG. 31 illustrates a block diagram of an example processor and/or SoC 3100 that may have one or more cores and an integrated memory controller. The solid lined boxes illustrate a processor 3100 with a single core 3102(A), system agent unit circuitry 3110, and a set of one or more interface controller unit(s) circuitry 3116, while the optional addition of the dashed lined boxes illustrates an alternative processor 3100 with multiple cores 3102(A)-(N), a set of one or more integrated memory controller unit(s) circuitry 3114 in the system agent unit circuitry 3110, and special purpose logic 3108, as well as a set of one or more interface controller units circuitry 3116. Note that the processor 3100 may be one of the processors 3070 or 3080, or co-processor 3038 or 3015 of FIG. 30.

Thus, different implementations of the processor 3100 may include: 1) a CPU with the special purpose logic 3108 being integrated graphics and/or scientific (throughput)

logic (which may include one or more cores, not shown), and the cores 3102(A)-(N) being one or more general purpose cores (e.g., general purpose in-order cores, general purpose out-of-order cores, or a combination of the two); 2) a coprocessor with the cores 3102(A)-(N) being a large number of special purpose cores intended primarily for graphics and/or scientific (throughput); and 3) a coprocessor with the cores 3102(A)-(N) being a large number of general purpose in-order cores. Thus, the processor 3100 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 3100 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 3104(A)-(N) within the cores 3102(A)-(N), a set of one or more shared cache unit(s) circuitry 3106, and external memory (not shown) coupled to the set of integrated memory controller unit(s) circuitry 3114. The set of one or more shared cache unit(s) circuitry 3106 may include one or more mid-level caches, such as level 2 (L2), level 3 (L3), level 4 (L4), or other levels of cache, such as a last level cache (LLC), and/or combinations thereof. While in some examples interface network circuitry 3112 (e.g., a ring interconnect) interfaces the special purpose logic 3108 (e.g., integrated graphics logic), the set of shared cache unit(s) circuitry 3106, and the system agent unit circuitry 3110, alternative examples use any number of well-known techniques for interfacing such units. In some examples, coherency is maintained between one or more of the shared cache unit(s) circuitry 3106 and cores 3102(A)-(N). In some examples, interface controller units circuitry 3116 couple the cores 3102 to one or more other devices 3118 such as one or more I/O devices, storage, one or more communication devices (e.g., wireless networking, wired networking, etc.), etc.

In some examples, one or more of the cores 3102(A)-(N) are capable of multithreading. The system agent unit circuitry 3110 includes those components coordinating and operating cores 3102(A)-(N). The system agent unit circuitry 3110 may include, for example, power control unit (PCU) circuitry and/or display unit circuitry (not shown). The PCU may be or may include logic and components needed for regulating the power state of the cores 3102(A)-(N) and/or the special purpose logic 3108 (e.g., integrated graphics logic). The display unit circuitry is for driving one or more externally connected displays.

The cores 3102(A)-(N) may be homogenous in terms of instruction set architecture (ISA). Alternatively, the cores 3102(A)-(N) may be heterogeneous in terms of ISA; that is, a subset of the cores 3102(A)-(N) may be capable of executing an ISA, while other cores may be capable of executing only a subset of that ISA or another ISA.

Example Core Architectures—In-order and Out-of-order Core Block Diagram.

Figure 32A:
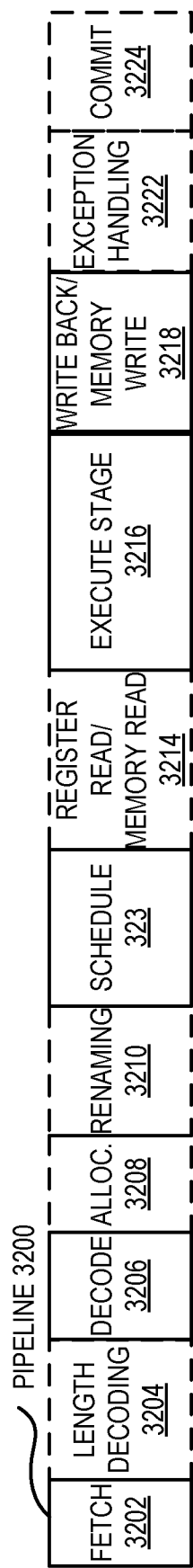
FIG. 32(A) is a block diagram illustrating both an example in-order pipeline and an example register renaming, out-of-order issue/execution pipeline according to examples.
Figure 32B:
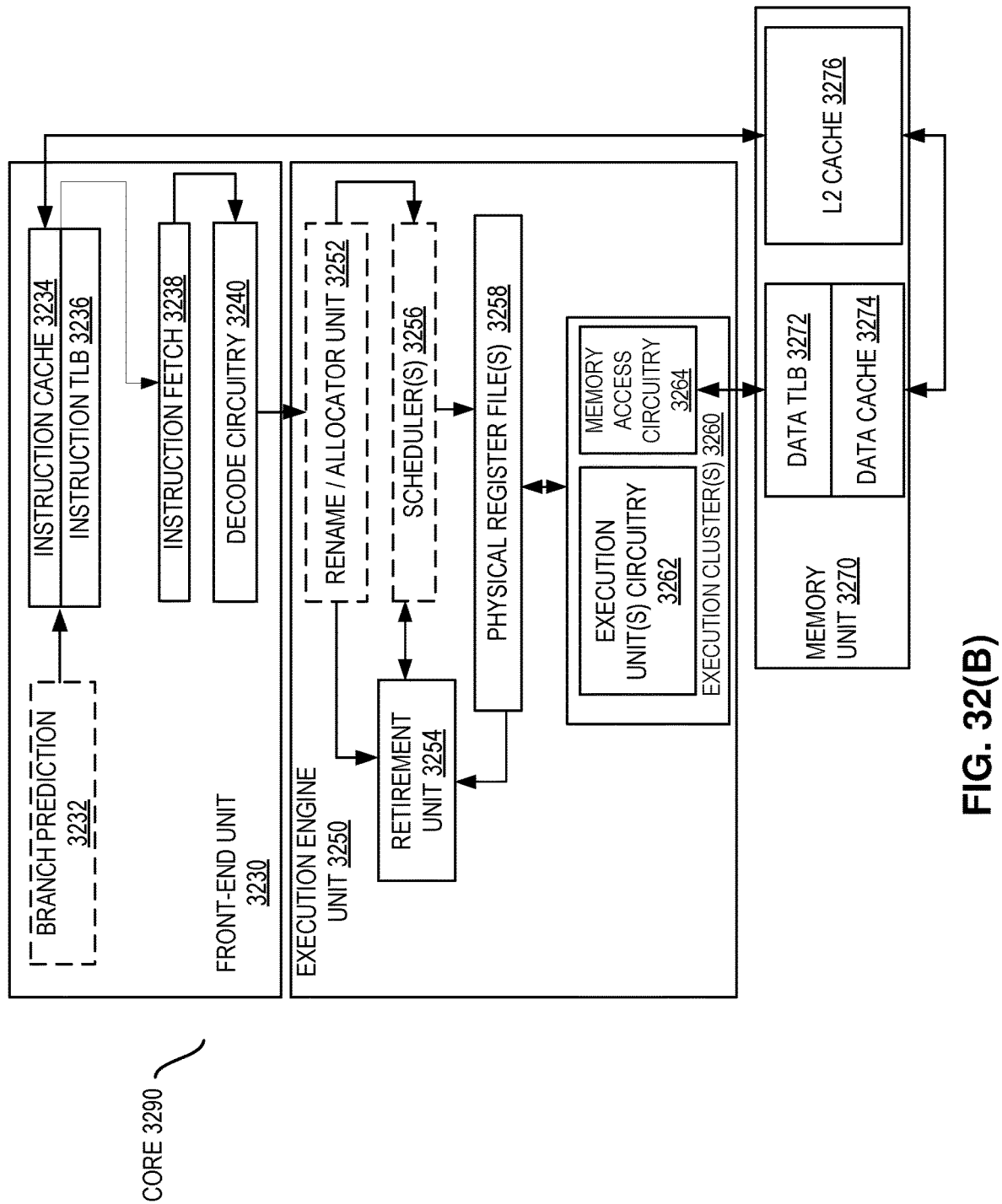
FIG. 32(B) is a block diagram illustrating both an example in-order architecture core and an example register renaming, out-of-order issue/execution architecture core to be included in a processor according to examples.

FIG. 32(A) is a block diagram illustrating both an example in-order pipeline and an example register renaming, out-of-order issue/execution pipeline according to examples. FIG. 32(B) is a block diagram illustrating both an example in-order architecture core and an example register renaming, out-of-order issue/execution architecture core to be included in a processor according to examples. The solid lined boxes in FIGS. 32(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 32(A), a processor pipeline 3200 includes a fetch stage 3202, an optional length decoding stage 3204, a decode stage 3206, an optional allocation (Alloc) stage 3208, an optional renaming stage 3210, a schedule (also known as a dispatch or issue) stage 3212, an optional register read/memory read stage 3214, an execute stage 3216, a write back/memory write stage 3218, an optional exception handling stage 3222, and an optional commit stage 3224. One or more operations can be performed in each of these processor pipeline stages. For example, during the fetch stage 3202, one or more instructions are fetched from instruction memory, and during the decode stage 3206, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 3206 and the register read/memory read stage 3214 may be combined into one pipeline stage. In one example, during the execute stage 3216, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 32(B) may implement the pipeline 3200 as follows: 1) the instruction fetch circuitry 3238 performs the fetch and length decoding stages 3202 and 3204; 2) the decode circuitry 3240 performs the decode stage 3206; 3) the rename/allocator unit circuitry 3252 performs the allocation stage 3208 and renaming stage 3210; 4) the scheduler(s) circuitry 3256 performs the schedule stage 3212; 5) the physical register file(s) circuitry 3258 and the memory unit circuitry 3270 perform the register read/memory read stage 3214; the execution cluster(s) 3260 perform the execute stage 3216; 6) the memory unit circuitry 3270 and the physical register file(s) circuitry 3258 perform the write back/memory write stage 3218; 7) various circuitry may be involved in the exception handling stage 3222; and 8) the retirement unit circuitry 3254 and the physical register file(s) circuitry 3258 perform the commit stage 3224.

FIG. 32(B) shows a processor core 3290 including front-end unit circuitry 3230 coupled to execution engine unit circuitry 3250, and both are coupled to memory unit circuitry 3270. The core 3290 may be a reduced instruction set architecture computing (RISC) core, a complex instruction set architecture computing (CISC) core, a very long instruction word (VLIW) core, or a hybrid or alternative core type. As yet another option, the core 3290 may be a special-purpose core, such as, for example, a network or communication core, compression engine, coprocessor core, general purpose computing graphics processing unit (GPGPU) core, graphics core, or the like.

The front-end unit circuitry 3230 may include branch prediction circuitry 3232 coupled to instruction cache circuitry 3234, which is coupled to an instruction translation lookaside buffer (TLB) 3236, which is coupled to instruction fetch circuitry 3238, which is coupled to decode circuitry 3240. In one example, the instruction cache circuitry 3234 is included in the memory unit circuitry 3270 rather than the front-end circuitry 3230. The decode circuitry 3240 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 3240 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 3240 may be implemented using various different mechanisms. Examples of suitable mechanisms include, but are not limited to, look-up tables, hardware implementations, programmable logic arrays (PLAs), microcode read only memories (ROMs), etc. In one example, the core 3290 includes a microcode ROM (not shown) or other medium that stores microcode for certain macroinstructions (e.g., in decode circuitry 3240 or otherwise within the front-end circuitry 3230). In one example, the decode circuitry 3240 includes a micro-operation (micro-op) or operation cache (not shown) to hold/cache decoded operations, micro-tags, or micro-operations generated during the decode or other stages of the processor pipeline 3200. The decode circuitry 3240 may be coupled to rename/allocator unit circuitry 3252 in the execution engine circuitry 3250.

The execution engine circuitry 3250 includes the rename/allocator unit circuitry 3252 coupled to retirement unit circuitry 3254 and a set of one or more scheduler(s) circuitry 3256. The scheduler(s) circuitry 3256 represents any number of different schedulers, including reservations stations, central instruction window, etc. In some examples, the scheduler(s) circuitry 3256 can include arithmetic logic unit (ALU) scheduler/scheduling circuitry, ALU queues, address generation unit (AGU) scheduler/scheduling circuitry, AGU queues, etc. The scheduler(s) circuitry 3256 is coupled to the physical register file(s) circuitry 3258. Each of the physical register file(s) circuitry 3258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 3258 includes vector registers unit circuitry, writemask registers unit circuitry, and scalar register unit circuitry. These register units may provide architectural vector registers, vector mask registers, general-purpose registers, etc. The physical register file(s) circuitry 3258 is coupled to the retirement unit circuitry 3254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 3254 and the physical register file(s) circuitry 3258 are coupled to the execution cluster(s) 3260. The execution cluster(s) 3260 includes a set of one or more execution unit(s) circuitry 3262 and a set of one or more memory access circuitry 3264. The execution unit(s) circuitry 3262 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 3256, physical register file(s) circuitry 3258, and execution cluster(s) 3260 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 3264). It should also be understood that where separate pipelines are used, one or more of these pipelines may be out-of-order issue/execution and the rest in-order.

In some examples, the execution engine unit circuitry 3250 may perform load store unit (LSU) address/data pipelining to an Advanced Microcontroller Bus (AMB) interface (not shown), and address phase and writeback, data phase load, store, and branches.

The set of memory access circuitry 3264 is coupled to the memory unit circuitry 3270, which includes data TLB circuitry 3272 coupled to data cache circuitry 3274 coupled to level 2 (L2) cache circuitry 3276. In one example, the memory access circuitry 3264 may include load unit circuitry, store address unit circuitry, and store data unit circuitry, each of which is coupled to the data TLB circuitry 3272 in the memory unit circuitry 3270. The instruction cache circuitry 3234 is further coupled to the level 2 (L2) cache circuitry 3276 in the memory unit circuitry 3270. In one example, the instruction cache 3234 and the data cache 3274 are combined into a single instruction and data cache (not shown) in L2 cache circuitry 3276, level 3 (L3) cache circuitry (not shown), and/or main memory. The L2 cache circuitry 3276 is coupled to one or more other levels of cache and eventually to a main memory.

The core 3290 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 3290 includes logic to support a packed data instruction set architecture extension (e.g., AVX1, AVX2), thereby allowing the operations used by many multimedia applications to be performed using packed data.

Example Execution Unit(s) Circuitry.

Figure 33:
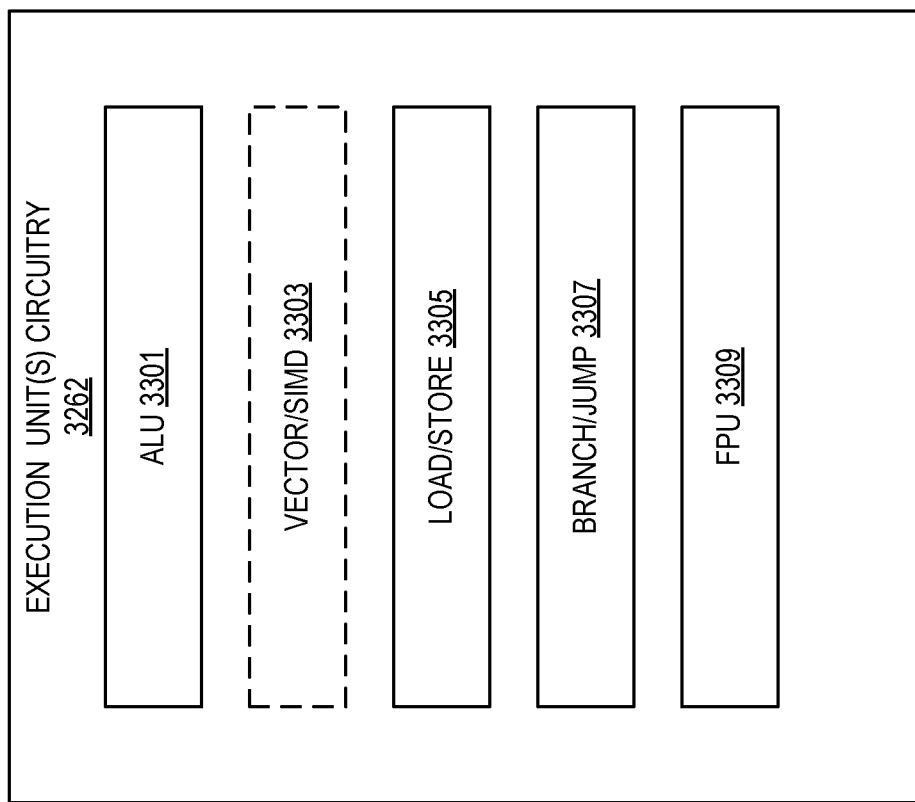
FIG. 33 illustrates examples of execution unit(s) circuitry.

FIG. 33 illustrates examples of execution unit(s) circuitry, such as execution unit(s) circuitry 3262 of FIG. 32(B). As illustrated, execution unit(s) circuitry 3262 may include one or more ALU circuits 3301, optional vector/single instruction multiple data (SIMD) circuits 3303, load/store circuits 3305, branch/jump circuits 3307, and/or Floating-point unit (FPU) circuits 3309. ALU circuits 3301 perform integer arithmetic and/or Boolean operations. Vector/SIMD circuits 3303 perform vector/SIMD operations on packed data (such as SIMD/vector registers). Load/store circuits 3305 execute load and store instructions to load data from memory into registers or store from registers to memory. Load/store circuits 3305 may also generate addresses. Branch/jump circuits 3307 cause a branch or jump to a memory address depending on the instruction. FPU circuits 3309 perform floating-point arithmetic. The width of the execution unit(s) circuitry 3262 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 34:
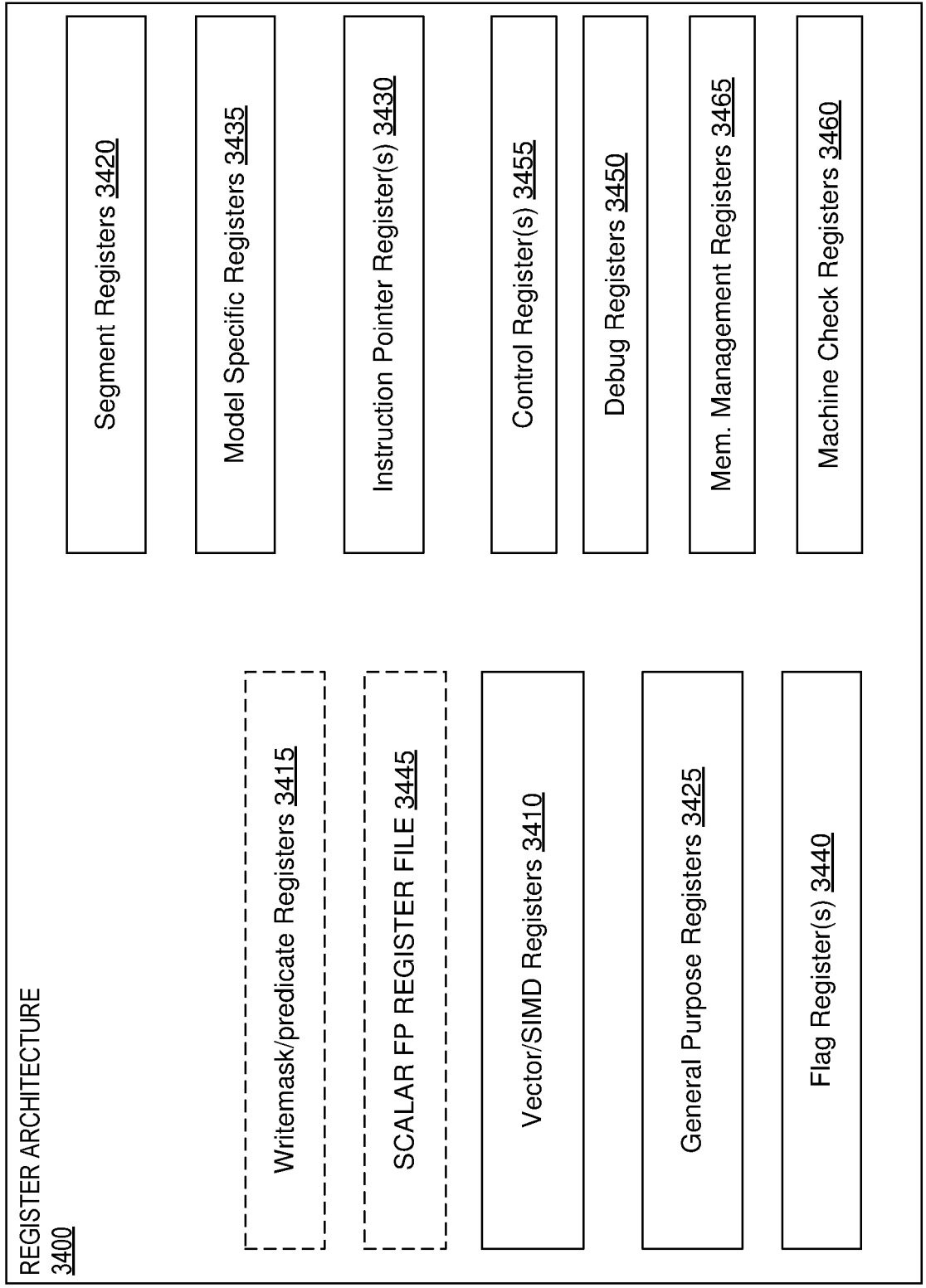
FIG. 34 is a block diagram of a register architecture according to some examples.

FIG. 34 is a block diagram of a register architecture 3400 according to some examples. As illustrated, the register architecture 3400 includes vector/SIMD registers 3410 that vary from 128-bit to 1,024 bits width. In some examples, the vector/SIMD registers 3410 are physically 512-bits and, depending upon the mapping, only some of the lower bits are used. For example, in some examples, the vector/SIMD registers 3410 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 3400 includes writemask/predicate registers 3415. For example, in some examples, there are 8 writemask/predicate registers (sometimes called k0 through k7) that are each 16-bit, 32-bit, 64-bit, or 128-bit in size. Writemask/predicate registers 3415 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 3415 corresponds to a data element position of the destination. In other examples, the writemask/predicate registers 3415 are scalable and consists of a set number of enable bits for a given vector element (e.g., 8 enable bits per 64-bit vector element).

The register architecture 3400 includes a plurality of general-purpose registers 3425. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 3400 includes scalar floating-point (FP) register file 3445 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 3440 (e.g., EFLAGS, RFLAGS, etc.) store status and control information for arithmetic, compare, and system operations. For example, the one or more flag registers 3440 may store condition code information such as carry, parity, auxiliary carry, zero, sign, and overflow. In some examples, the one or more flag registers 3440 are called program status and control registers.

Segment registers 3420 contain segment points for use in accessing memory. In some examples, these registers are referenced by the names CS, DS, SS, ES, FS, and GS.

Model specific registers or machine specific registers (MSRs) 3435 control and report on processor performance. Most MSRs 3435 handle system-related functions and are not accessible to an application program. For example, MSRs may provide control for one or more of: performance-monitoring counters, debug extensions, memory type range registers, thermal and power management, instruction-specific support, and/or processor feature/mode support. Machine check registers 3460 consist of control, status, and error reporting MSRs that are used to detect and report on hardware errors. Control register(s) 3455 (e.g., CR0-CR4) determine the operating mode of a processor (e.g., processor 3070, 3080, 3038, 3015, and/or 3100) and the characteristics of a currently executing task. In some examples, MSRs 3435 are a subset of control registers 3455.

One or more instruction pointer register(s) 3430 store an instruction pointer value. Debug registers 3450 control and allow for the monitoring of a processor or core's debugging operations.

Memory (mem) management registers 3465 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 3400 may, for example, be used in register file/memory 'ISAB08, or physical register file(s) circuitry 32 58.

Instruction set architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below.

Examples of the instruction(s) may be executed on such systems, architectures, and pipelines, but are not limited to those detailed.

Figure 35:
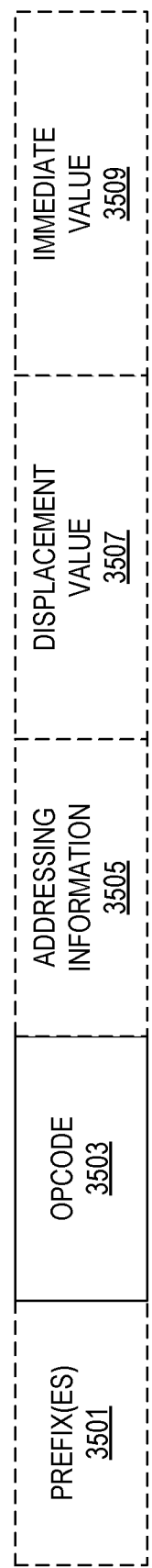
FIG. 35 illustrates examples of an instruction format.

FIG. 35 illustrates examples of an instruction format. As illustrated, an instruction may include multiple components including, but not limited to, one or more fields for: one or more prefixes 3501, an opcode 3503, addressing information 3505 (e.g., register identifiers, memory addressing information, etc.), a displacement value 3507, and/or an immediate value 3509. Note that some instructions utilize some or all the fields of the format whereas others may only use the field for the opcode 3503. In some examples, the order illustrated is the order in which these fields are to be encoded, however, it should be appreciated that in other examples these fields may be encoded in a different order, combined, etc.

The prefix(es) field(s) 3501, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3503 is used to at least partially define the operation to be performed upon a decoding of the instruction. In some examples, a primary opcode encoded in the opcode field 3503 is one, two, or three bytes in length. In other examples, a primary opcode can be a different length. An additional 3-bit opcode field is sometimes encoded in another field.

Figure 36:
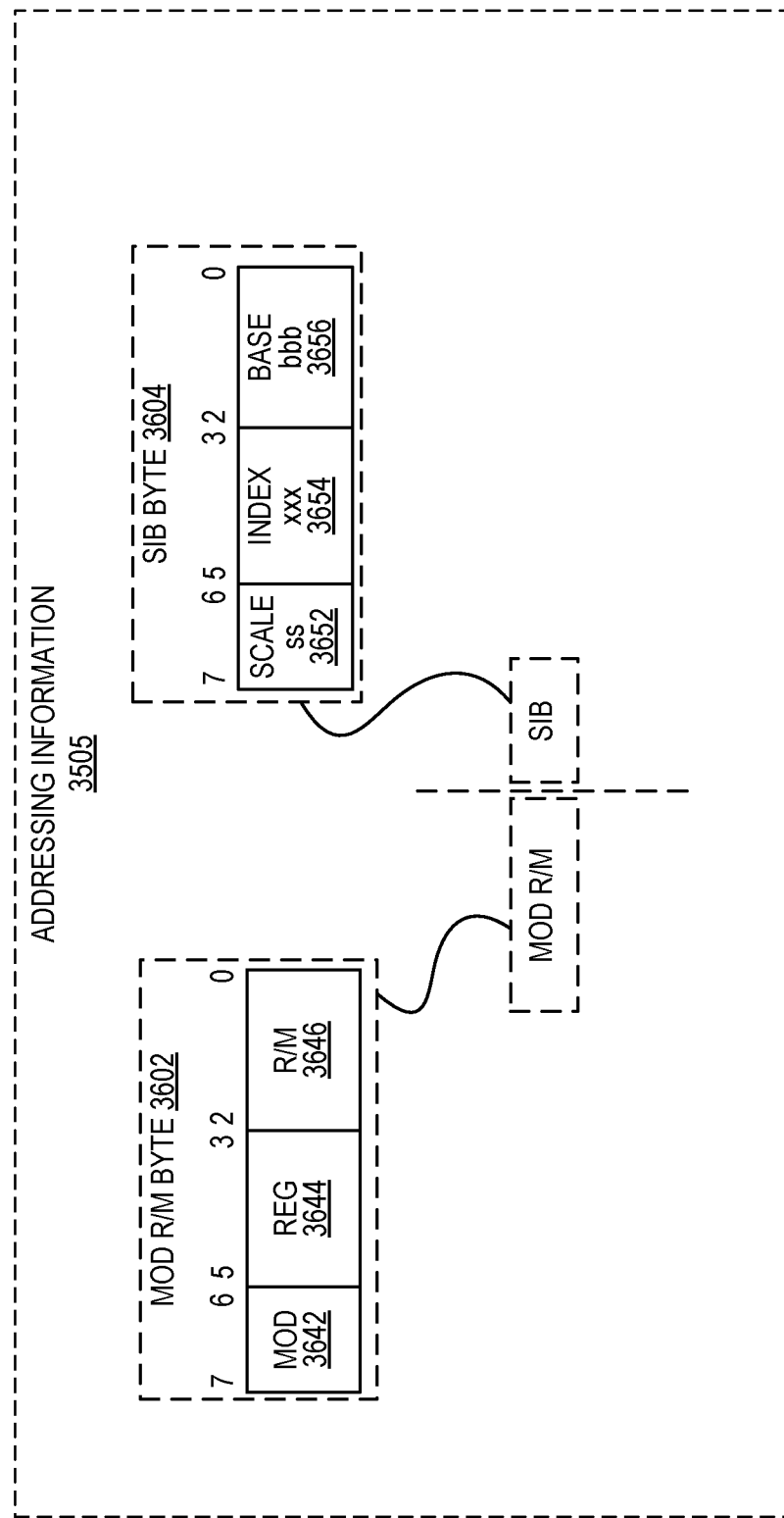
FIG. 36 illustrates examples of an addressing information field.

The addressing information field 3505 is used to address one or more operands of the instruction, such as a location in memory or one or more registers. FIG. 36 illustrates examples of the addressing information field 3505. In this illustration, an optional MOD R/M byte 3602 and an optional Scale, Index, Base (SIB) byte 3604 are shown. The MOD R/M byte 3602 and the SIB byte 3604 are used to encode up to two operands of an instruction, each of which is a direct register or effective memory address. Note that both of these fields are optional in that not all instructions include one or more of these fields. The MOD R/M byte 3602 includes a MOD field 3642, a register (reg) field 3644, and R/M field 3646.

The content of the MOD field 3642 distinguishes between memory access and non-memory access modes. In some examples, when the MOD field 3642 has a binary value of 11 (11b), a register-direct addressing mode is utilized, and otherwise a register-indirect addressing mode is used.

The register field 3644 may encode either the destination register operand or a source register operand or may encode an opcode extension and not be used to encode any instruction operand. The content of register field 3644, directly or through address generation, specifies the locations of a source or destination operand (either in a register or in memory). In some examples, the register field 3644 is supplemented with an additional bit from a prefix (e.g., prefix 3501) to allow for greater addressing.

The R/M field 3646 may be used to encode an instruction operand that references a memory address or may be used to encode either the destination register operand or a source register operand. Note the R/M field 3646 may be combined with the MOD field 3642 to dictate an addressing mode in some examples.

The SIB byte 3604 includes a scale field 3652, an index field 3654, and a base field 3656 to be used in the generation of an address. The scale field 3652 indicates a scaling factor. The index field 3654 specifies an index register to use. In some examples, the index field 3654 is supplemented with an additional bit from a prefix (e.g., prefix 3501) to allow for greater addressing. The base field 3656 specifies a base register to use. In some examples, the base field 3656 is supplemented with an additional bit from a prefix (e.g., prefix 3501) to allow for greater addressing. In practice, the content of the scale field 3652 allows for the scaling of the content of the index field 3654 for memory address generation (e.g., for address generation that uses $2^{scale}$*index+ base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 3507 provides this value. Additionally, in some examples, a displacement factor usage is encoded in the MOD field of the addressing information field 3505 that indicates a compressed displacement scheme for which a displacement value is calculated and stored in the displacement field 3507.

In some examples, the immediate value field 3509 specifies an immediate value for the instruction. An immediate value may be encoded as a 1-byte value, a 2-byte value, a 4-byte value, etc.

Figure 37:
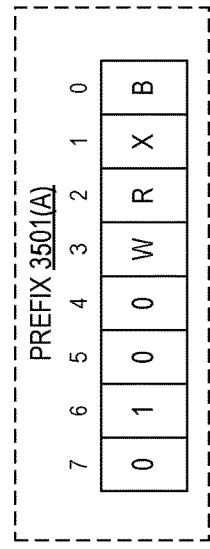
FIG. 37 illustrates examples of a first prefix.

FIG. 37 illustrates examples of a first prefix 3501(A). In some examples, the first prefix 3501(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3501(A) may specify up to three registers using 3-bit fields depending on the format: 1) using the reg field 3644 and the R/M field 3646 of the MOD R/M byte 3602; 2) using the MOD R/M byte 3602 with the SIB byte 3604 including using the reg field 3644 and the base field 3656 and index field 3654; or 3) using the register field of an opcode.

In the first prefix 3501(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 3644 and MOD R/M R/M field 3646 alone can each only address 8 registers.

In the first prefix 3501(A), bit position 2 (R) may be an extension of the MOD R/M reg field 3644 and may be used to modify the MOD R/M reg field 3644 when that field encodes a general-purpose register, a 64-bit packed data register (e.g., a SSE register), or a control or debug register. R is ignored when MOD R/M byte 3602 specifies other registers or defines an extended opcode.

Bit position 1 (X) may modify the SIB byte index field 3654.

Bit position 0 (B) may modify the base in the MOD R/M R/M field 3646 or the SIB byte base field 3656; or it may modify the opcode register field used for accessing general purpose registers (e.g., general purpose registers 3425).

Figure 38A:
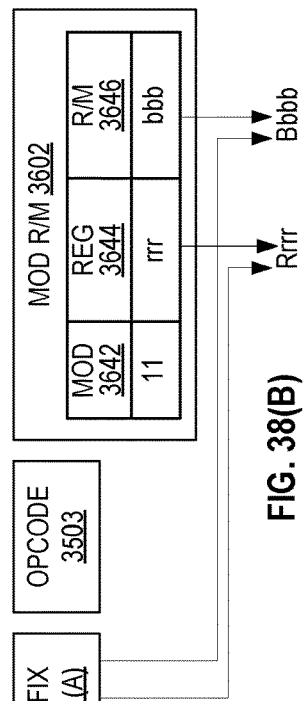
FIGS. 38(A)-(D) illustrate examples of how the R, X, and B fields of the first prefix in FIG. 37 are used.
Figure 38B:
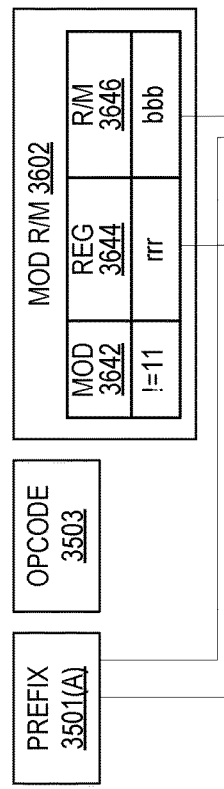
Figure 38C:
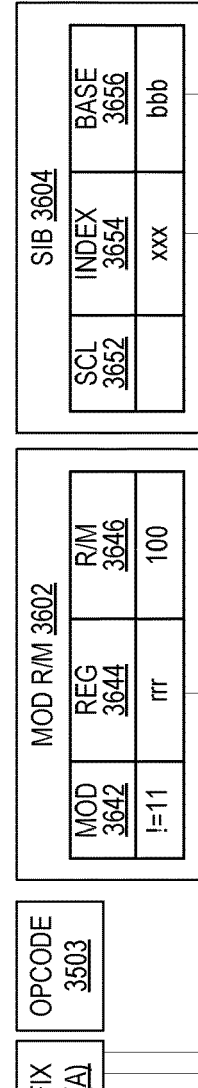
Figure 38D:
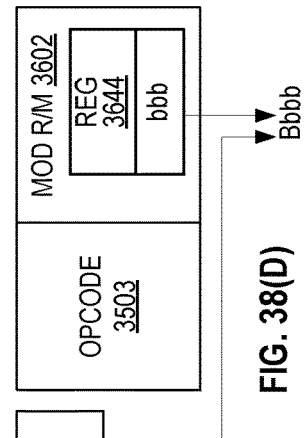

FIGS. 38(A)-(D) illustrate examples of how the R, X, and B fields of the first prefix 3501(A) are used. FIG. 38(A) illustrates R and B from the first prefix 3501(A) being used to extend the reg field 3644 and R/M field 3646 of the MOD R/M byte 3602 when the SIB byte 36 04 is not used for memory addressing. FIG. 38(B) illustrates R and B from the first prefix 3501(A) being used to extend the reg field 3644 and R/M field 3646 of the MOD R/M byte 3602 when the SIB byte 36 04 is not used (register-register addressing). FIG. 38(C) illustrates R, X, and B from the first prefix 3501(A) being used to extend the reg field 3644 of the MOD R/M byte 3602 and the index field 3654 and base field 3656 when the SIB byte 36 04 being used for memory addressing. FIG. 38(D) illustrates B from the first prefix 3501(A) being used to extend the reg field 3644 of the MOD R/M byte 3602 when a register is encoded in the opcode 3503.

Figure 39A:
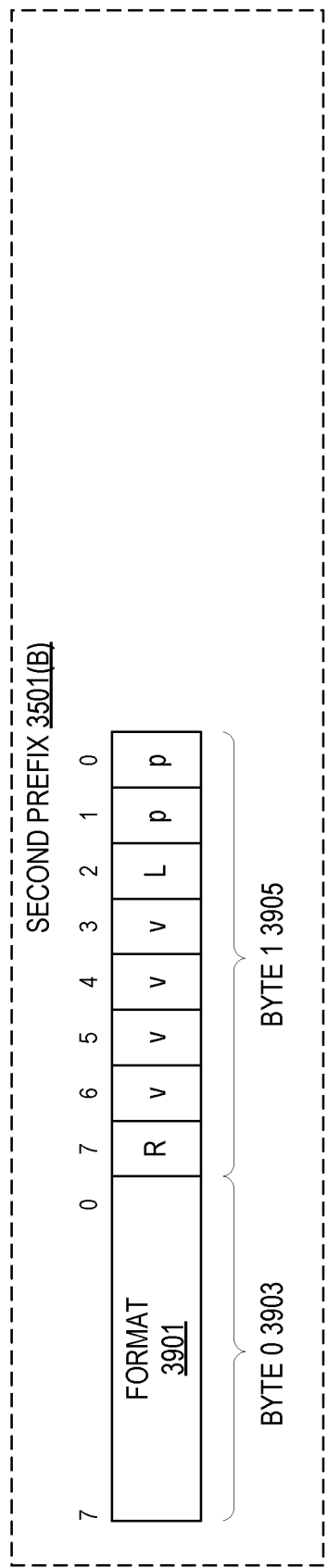
FIGS. 39(A)-(B) illustrate examples of a second prefix.
Figure 39B:
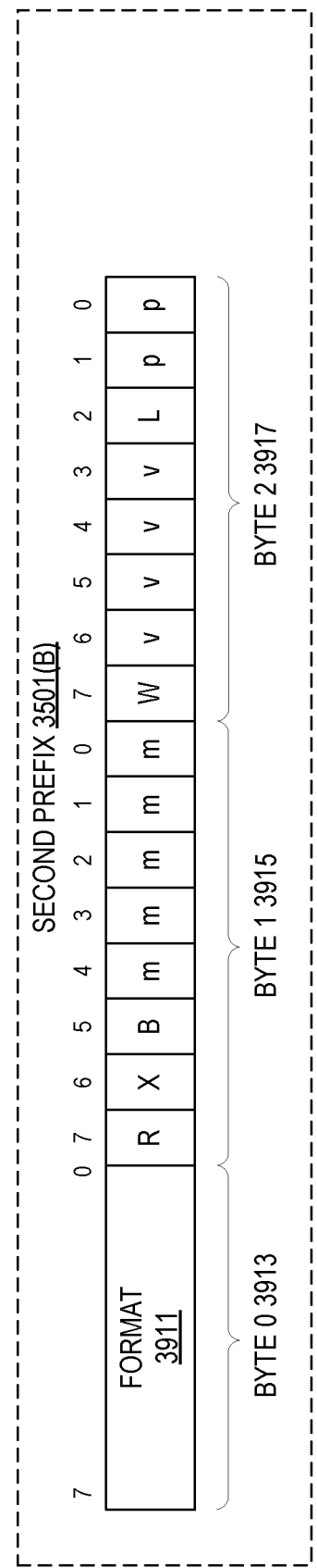

FIGS. 39(A)-(B) illustrate examples of a second prefix 3501(B). In some examples, the second prefix 3501(B) is an example of a VEX prefix. The second prefix 3501(B) encoding allows instructions to have more than two operands, and allows SIMD vector registers (e.g., vector/SIMD registers 3410) to be longer than 64-bits (e.g., 128-bit and 256-bit). The use of the second prefix 3501(B) provides for three-operand (or more) syntax. For example, previous two-operand instructions performed operations such as A=A+B, which overwrites a source operand. The use of the second prefix 3501(B) enables operands to perform nondestructive operations such as A=B+C.

In some examples, the second prefix 3501(B) comes in two forms—a two-byte form and a three-byte form. The two-byte second prefix 3501(B) is used mainly for 128-bit, scalar, and some 256-bit instructions; while the three-byte second prefix 3501(B) provides a compact replacement of the first prefix 3501(A) and 3-byte opcode instructions.

FIG. 39(A) illustrates examples of a two-byte form of the second prefix 3501(B). In one example, a format field 3901 (byte 0 3903) contains the value C5H. In one example, byte 1 3905 includes an "R" value in bit[7]. This value is the complement of the "R" value of the first prefix 3501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 3646 to encode the instruction operand that references a memory address or encode either the destination register operand or a source register operand.

Instructions that use this prefix may use the MOD R/M reg field 3644 to encode either the destination register operand or a source register operand, or to be treated as an opcode extension and not used to encode any instruction operand.

For instruction syntax that support four operands, vvvv, the MOD R/M R/M field 3646 and the MOD R/M reg field 3644 encode three of the four operands. Bits[7:4] of the immediate value field 3509 are then used to encode the third source register operand.

FIG. 39(B) illustrates examples of a three-byte form of the second prefix 3501(B). In one example, a format field 3911 (byte 0 3913) contains the value C4H. Byte 1 3915 includes in bits[7:5] "R," "X," and "B" which are the complements of the same values of the first prefix 3501(A). Bits[4:0] of byte 1 3915 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 3917 is used similar to W of the first prefix 3501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 3646 to encode the instruction operand that references a memory address or encode either the destination register operand or a source register operand.

Instructions that use this prefix may use the MOD R/M reg field 3644 to encode either the destination register operand or a source register operand, or to be treated as an opcode extension and not used to encode any instruction operand.

For instruction syntax that support four operands, vvvv, the MOD R/M R/M field 3646, and the MOD R/M reg field 3644 encode three of the four operands. Bits[7:4] of the immediate value field 3509 are then used to encode the third source register operand.

Figure 40:
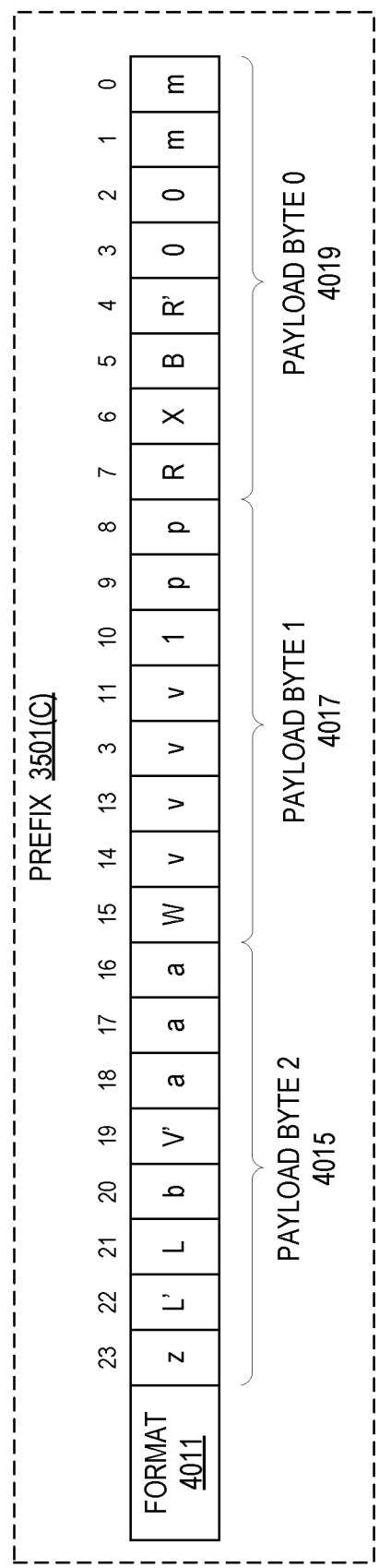
FIG. 40 illustrates examples of a third prefix.

FIG. 40 illustrates examples of a third prefix 3501(C). In some examples, the third prefix 3501(C) is an example of an EVEX prefix. The third prefix 3501(C) is a four-byte prefix.

The third prefix 3501(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 34) or predication utilize this prefix. Opmask register allow for conditional processing or selection control. Opmask instructions, whose source/destination operands are opmask registers and treat the content of an opmask register as a single value, are encoded using the second prefix 3501(B).

The third prefix 3501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3501(C) is a format field 4011 that has a value, in one example, of 62H. Subsequent bytes are referred to as payload bytes 4015-4019 and collectively form a 24-bit value of P[23:0] providing specific capability in the form of one or more fields (detailed herein).

In some examples, P[1:0] of payload byte 4019 are identical to the low two mm bits. P[3:2] are reserved in some examples. Bit P[4] (R') allows access to the high 16 vector register set when combined with P[7] and the MOD R/M reg field 3644. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 3644 and MOD R/M R/M field 3646. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 3501(A) and second prefix 3511(B) and may serve as an opcode extension bit or operand size promotion.

P[18:16] specify the index of a register in the opmask (writemask) registers (e.g., writemask/predicate registers 3415). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 3501(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 41:
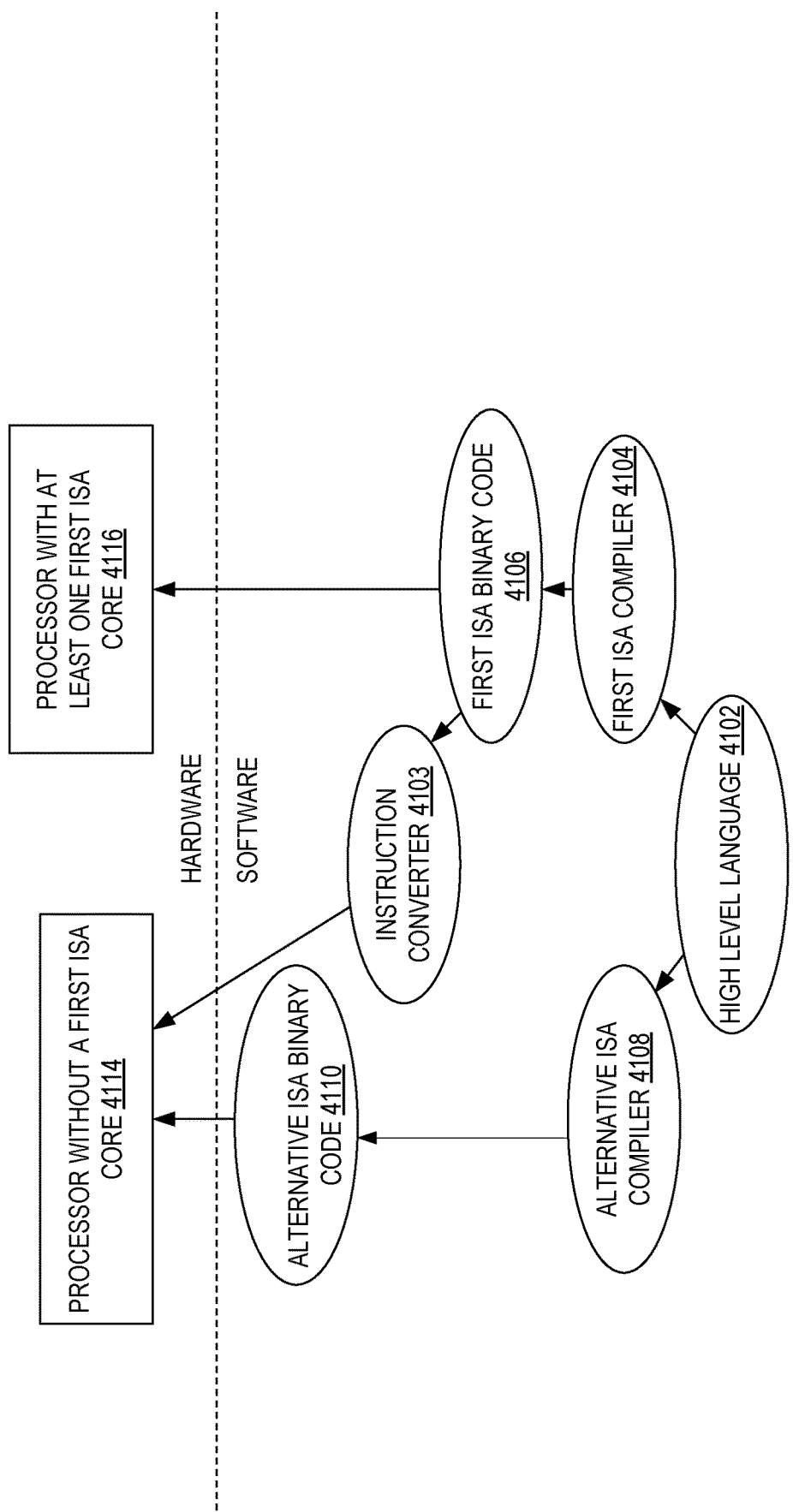
FIG. 41 is a block diagram illustrating the use of a software instruction converter to convert binary instructions in a source instruction set architecture to binary instructions in a target instruction set architecture according to examples.

FIG. 41 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 41 shows a program in a high-level language 4102 may be compiled using a first ISA compiler 4104 to generate first ISA binary code 4106 that may be natively executed by a processor with at least one first ISA core 4116. The processor with at least one first ISA core 4116 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 4104 represents a compiler that is operable to generate first ISA binary code 4106 (e.g., object code) that can, with or without additional linkage processing, be executed on the processor with at least one first ISA core 4116. Similarly, FIG. 41 shows the program in the high-level language 4102 may be compiled using an alternative ISA compiler 4108 to generate alternative ISA binary code 4110 that may be natively executed by a processor without a first ISA core 4114. The instruction converter 4112 is used to convert the first ISA binary code 4106 into code that may be natively executed by the processor without a first ISA core 4114. This converted code is not necessarily to be the same as the alternative ISA binary code 4110; however, the converted code will accomplish the general operation and be made up of instructions from the alternative ISA. Thus, the instruction converter 4112 represents software, firmware, hardware, or a combination thereof that, through emulation, simulation or any other process, allows a processor or other electronic device that does not have a first ISA processor or core to execute the first ISA binary code 4106.

Exemplary embodiments include, but are not limited to:
1. An apparatus comprising:
    decode circuitry to decode an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of FP8 data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to FP32, multiply converted even FP8 elements from the two specified source matrix operands to generate a first product and separately multiply converted odd FP8 elements from the specified source matrix operands to generate second product, and accumulate the first and second products with previous contents of the source/destination matrix operand; and
    execution circuitry to respond to the decoded instruction as specified by the opcode.
2. The apparatus of example 1, wherein elements of the first plurality of source matrix operands are in an 8-bit floating point format.
3. The apparatus of example 2, wherein the sparsity controls are to select four data elements from the first plurality of source matrix operands per row.
4. The apparatus of example 1, wherein elements of the first plurality of source matrix operands are in an 8-bit floating-point format having 1 bit for a sign, 5 bits for an exponent, and two bits for a fraction.
5. The apparatus of example 4, wherein the sparsity controls are to select four data elements from the first plurality of source matrix operands per row.
6. The apparatus of example 1, wherein elements of the first plurality of source matrix operands are in an 8-bit floating-point format having 1 bit for a sign, 4 bits for an exponent, and three bits for a fraction.
7. The apparatus of example 1, wherein elements of the first plurality of source matrix operands are in an 8-bit floating-point format having either 1 bit for a sign, 4 bits for an exponent, and three bits for a fraction, or 1 bit for a sign, 5 bits for an exponent, and two bits for a fraction.
8. The apparatus of example 1, wherein the opcode is to further indicate the execution circuitry is to zero rows of the source/destination matrix that are not involved in the accumulation.

9. A method comprising:
decoding an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of FP8 data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to FP32, multiply converted even FP8 elements from the two specified source matrix operands to generate a first product and separately multiply converted odd FP8 elements from the specified source matrix operands to generate second product, and accumulate the first and second products with previous contents of the source/destination matrix operand; and executing the decoded single instruction according to the opcode.

10. The method of example 9, wherein elements of the first plurality of source matrix operands are in an 8-bit floating point format.

11. The method of example 10, wherein the sparsity controls are to select four data elements from the first plurality of source matrix operands per row.

12. The method of example 9, wherein elements of the first plurality of source matrix operands are in an 8-bit floating-point format having 1 bit for a sign, 5 bits for an exponent, and two bits for a fraction.

13. The method of example 12, wherein the sparsity controls are to select four data elements from the first plurality of source matrix operands per row.

14. The method of example 12, wherein elements of the first plurality of source matrix operands are in an 8-bit floating-point format having 1 bit for a sign, 4 bits for an exponent, and three bits for a fraction.

15. The method of example 12, wherein elements of the first plurality of source matrix operands are in an 8-bit floating-point format having either 1 bit for a sign, 4 bits for an exponent, and three bits for a fraction, or 1 bit for a sign, 5 bits for an exponent, and two bits for a fraction.

16. The method of example 9, wherein the opcode is to further indicate the execution circuitry is to zero rows of the source/destination matrix that are not involved in the accumulation.

17. A non-transitory machine readable medium that stores program code that when executed by a machine causes the machine to perform a method comprising:
decoding an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of FP8 data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to FP32, multiply converted even FP8 elements from the two specified source matrix operands to generate a first product and separately multiply converted odd FP8 elements from the specified source matrix operands to generate second product, and accumulate the first and second products with previous contents of the source/destination matrix operand; and executing the decoded single instruction according to the opcode.

18. The non-transitory machine-readable medium of example 17, wherein elements of the first plurality of source matrix operands are in an 8-bit floating point format.

19. The non-transitory machine-readable medium of example 18, wherein the sparsity controls are to select four data elements from the first plurality of source matrix operands per row.

20. The non-transitory machine-readable medium of example 17, wherein elements of the first plurality of source matrix operands are in a 8-bit floating-point format having 1 bit for a sign, 5 bits for an exponent, and two bits for a fraction.

21. The non-transitory machine-readable medium of example 20, wherein the sparsity controls are to select four data elements from the first plurality of source matrix operands per row.

22. The non-transitory machine-readable medium of example 20, wherein elements of the first plurality of source matrix operands are in a 8-bit floating-point format having 1 bit for a sign, 4 bits for an exponent, and three bits for a fraction.

23. The non-transitory machine-readable medium of example 20, wherein elements of the first plurality of source matrix operands are in a 8-bit floating-point format having either 1 bit for a sign, 4 bits for an exponent, and three References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
decode circuitry to decode an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of 8-bit floating point (FP8) data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to 32-bit floating point (FP32), multiply converted even FP8 elements from the identified source matrix operands to generate a first product and separately multiply converted odd FP8 elements from the specified source matrix operands to generate second product, and accumulate the first and second products with previous contents of the source/destination matrix operand, wherein to convert a FP8 element at least comprises applying an exponent variable bias, provided by an operand of the instruction, during a conversion; and execution circuitry to respond to the decoded instruction as specified by the opcode.

2. The apparatus of claim 1, wherein elements of the first plurality of source matrix operands are in an 8-bit floating point format.

3. The apparatus of claim 2, wherein the sparsity controls are to select four data elements from the first plurality of source matrix operands per row.

4. The apparatus of claim 1, wherein elements of the first plurality of source matrix operands are in an 8-bit floating-point format having 1 bit for a sign, 5 bits for an exponent, and two bits for a fraction.

5. The apparatus of claim 4, wherein the sparsity controls are to select four data elements from the first plurality of source matrix operands per row.

6. The apparatus of claim 1, wherein elements of the first plurality of source matrix operands are in an 8-bit floating-point format having 1 bit for a sign, 4 bits for an exponent, and three bits for a fraction.

7. The apparatus of claim 1, wherein elements of the first plurality of source matrix operands are in an 8-bit floating-point format having either 1 bit for a sign, 4 bits for an exponent, and three bits for a fraction, or 1 bit for a sign, 5 bits for an exponent, and two bits for a fraction.

8. The apparatus of claim 1, wherein the opcode is to further indicate the execution circuitry is to zero rows of the source/destination matrix that are not involved in the accumulation.

9. A method comprising:

decoding an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of 8-bit floating point (FP8) data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to 32-bit floating point (FP32), multiply converted even FP8 elements from the identified source matrix operands to generate a first product and separately multiply converted odd FP8 elements from the specified source matrix operands to generate second product, and accumulate the first and second products with previous contents of the source/destination matrix operand, wherein to convert a F8 element at least comprises applying an exponent variable bias, provided by an operand of the insruction, during a conversion; and executing the decoded single instruction according to the opcode.

10. The method of claim 9, wherein elements of the first plurality of source matrix operands are in an 8-bit floating point format.

11. The method of claim 10, wherein the sparsity controls are to select four data elements from the first plurality of source matrix operands per row.

12. The method of claim 9, wherein elements of the first plurality of source matrix operands are in an 8-bit floating-point format having 1 bit for a sign, 5 bits for an exponent, and two bits for a fraction.

13. The method of claim 12, wherein the sparsity controls are to select four data elements from the first plurality of source matrix operands per row.

14. The method of claim 12, wherein elements of the first plurality of source matrix operands are in an 8-bit floating-point format having 1 bit for a sign, 4 bits for an exponent, and three bits for a fraction.

15. The method of claim 12, wherein elements of the first plurality of source matrix operands are in an 8-bit floating-point format having either 1 bit for a sign, 4 bits for an exponent, and three bits for a fraction, or 1 bit for a sign, 5 bits for an exponent, and two bits for a fraction.

16. The method of claim 9, wherein the opcode is to further indicate the execution circuitry is to zero rows of the source/destination matrix that are not involved in the accumulation.

17. A non-transitory machine-readable medium that stores program code that when executed by a machine causes the machine to perform a method comprising:

decoding an instance of a single instruction having one or more fields for an opcode, one or more fields to identify a source/destination matrix operand, one or more fields to identify a first plurality of source matrix operands, one or more fields to identify a second plurality of matrix operands, wherein the opcode is to indicate that execution circuitry is to select a proper subset of 8-bit floating point (FP8) data elements from the first plurality of source matrix operands based on sparsity controls from a first matrix operand of the second plurality of matrix operands, for each element position of the source/destination matrix operand, convert pairs of FP8 elements, as selected, from a row of the first source matrix operands and pairs of FP8 elements from a column of one of the second source matrix operands to 32-bit floating point (FP32), multiply converted even FP8 elements from the identified source matrix operands to generate a first product and separately multiply converted odd FP8 elements from the specified source matrix operands to generate second product, and accumulate the first and second products with previous contents of the source/destination matrix operand, wherein to convert a FP8 element at least comprises applying an exponent variable bias, provided by an operand of the instruction, during a conversion; and executing the decoded single instruction according to the opcode.

18. The non-transitory machine-readable medium of claim 17, wherein elements of the first plurality of source matrix operands are in an 8-bit floating point format.

19. The non-transitory machine-readable medium of claim 18, wherein the sparsity controls are to select four data elements from the first plurality of source matrix operands per row.

20. The non-transitory machine-readable medium of claim 17, wherein elements of the first plurality of source matrix operands are in an 8-bit floating-point format having 1 bit for a sign, 5 bits for an exponent, and two bits for a fraction.

21. The non-transitory machine-readable medium of claim 20, wherein the sparsity controls are to select four data elements from the first plurality of source matrix operands per row.

22. The non-transitory machine-readable medium of claim 20, wherein elements of the first plurality of source matrix operands are in an 8-bit floating-point format having 1 bit for a sign, 4 bits for an exponent, and three bits for a fraction.

23. The non-transitory machine-readable medium of claim 20, wherein elements of the first plurality of source matrix operands are in an 8-bit floating-point format having either 1 bit for a sign, 4 bits for an exponent, and three bits for a fraction, or 1 bit for a sign, 5 bits for an exponent, and two bits for a fraction.

* * * * *